United States Patent [19]
Engelbert et al.

[11] Patent Number: 5,409,303
[45] Date of Patent: Apr. 25, 1995

[54] FULL FUNCTION SKID CONTROL BRAKING SYSTEM FOR VEHICLES

[75] Inventors: David G. Engelbert; Robert S. Taylor; Steven D. Wallestad, all of Kansas City, Mo.

[73] Assignee: Midland Brake, Inc., Kansas City, Mo.

[21] Appl. No.: 252,931

[22] Filed: Jun. 2, 1994

[51] Int. Cl.6 .......................... B60T 8/32; B60T 13/00
[52] U.S. Cl. ...................................... 303/118.1; 303/7; 303/28; 303/40; 303/71; 303/9.76; 303/68; 303/119.1; 188/170
[58] Field of Search .................. 303/118.1, 28, 29, 30, 303/40, 7, 119.2, 119.1, 71, 113.1, 9, 68, 13, 69, 9.76; 137/627.5; 188/3 R, 3 H, 170

[56] References Cited

U.S. PATENT DOCUMENTS 3,836,209  9/1974  Neisch ............................. 303/118.1
3,857,614 12/1974  Kurichl ........................... 303/118.1
3,929,381 12/1985  Durling ................................ 303/7
5,236,250  8/1993  Moody et al. ........................ 303/71

Primary Examiner—Douglas C. Butler
Attorney, Agent, or Firm—Leydig, Voit & Mayer, Ltd.

[57] ABSTRACT

A full function skid control valve assembly for use in an air brake system which provides for brake control utilizing a compact single assembly. The system provides for the maintenance of certain minimum operating pressures so that, when the air pressure within the vehicle brake system falls below predetermined levels, the valve assembly automatically partially or entirely exhausts the air pressure sometimes causing the spring parking brakes to engage. Once the air pressure within the brake system returns to predetermined levels, the valve assembly will allow a reservoir to be charged and the spring brakes to be deactuated. During operation, the assembly provides control of the service brakes while preventing undesired skid conditions.

11 Claims, 21 Drawing Sheets

FULL FUNCTION SKID CONTROL BRAKING SYSTEM FOR VEHICLES

FIELD OF THE INVENTION

This invention relates to a braking system for vehicles including full function skid control. In particular, the braking system of the present invention includes a single package valve assembly for controlling the spring brakes and the service brakes of an air braking system for vehicles, particularly heavy-duty tractor-trailer combinations associated with the trucking industry.

BACKGROUND OF THE INVENTION

Skid control braking systems are becoming increasingly available for tractor trailers utilized in the transportation of commerce over roadways throughout the world. The skid control braking systems represent significant improvement in safety for tractor trailers. In some of the braking systems, spring brake systems are utilized to prevent unintended movement of the trailer when parked.

Other braking systems provide skid control utilizing single channel skid control systems wherein a plurality of speed sensors associated with wheels on each side of the vehicle generate a wheel speed signal. Based on the wheel speed signals, the skid control systems control the braking of the wheels. In the past, such skid control systems have been added to pre-existing spring brake systems of the trailer braking system. Consequently, the resulting systems included a number of discreet component valves which were fitted separately to the trailer and were individually connected to separate electrical and air lines.

As a result, the valve assemblies were beset with many shortcomings including:
a) the separate valves required complex and time consuming installation;
b) due to the lack of available space on the vehicle or trailer, the valves had to be mounted in various locations making assembly difficult and troubleshooting cumbersome;
c) the separate valves required the use of special air reservoirs which were very expensive;
d) utilizing so many valves necessitated the use of many expensive connectors which often caused significant line resistance and air leaks;
e) an inordinate amount of costly pneumatic tubing was required to interconnect the valves of the devices; and,
f) the multiple components and additional tubing led to costly installation, maintenance and repair problems, aggravated by wear and failure of the excessive tubing requirements.

OBJECTS OF THE INVENTION

It is therefore a general object of the present invention to overcome one or more of the problems set forth above.

It is a primary object of the invention to provide a lower-cost full function skid control braking system which minimizes the number of discreet component valves required while providing an anti-skid braking system that is easy to install on a vehicle or trailer and simple and inexpensive to service and maintain.

A further object of the invention is to reduce the number and complexity of the fittings and tubing needed for the system and, thus, to improve the safety and to reduce the cost of the system, particularly maintenance cost.

A further object of the invention is to permit the use of standard brake components in the system to reduce cost and improve versatility.

These and other objects of the present invention will become apparent from the description hereinafter set forth.

SUMMARY OF THE INVENTION

The improved skid control braking system of the present invention includes a multi-valve assembly in a compact unit which is easily installed and of sturdy construction. This will be apparent to those skilled in the art as details of several embodiments are set forth.

In accordance with a preferred embodiment of the invention, an improved full function skid control valve assembly is provided as a single unit, which may be incorporated within an integral housing. The skid control valve assembly may be utilized to control the vehicle spring brake system and the vehicle service brake system. The overall braking system includes a pressurized supply air for maintaining the air pressure within the vehicle braking system at a predetermined level, a skid control sensor for sensing skid conditions, a skid control unit for receiving skid control signals and controlling the service brake air pressure, a brake cylinder having a service brake chamber and a spring brake chamber, and a reservoir adapted to accumulate and maintain air at a predetermined pressure for actuating and de-actuating the brakes of the vehicle.

The skid control valve assembly includes a spring brake control module within the unit for permitting air above a predetermined pressure to enter the reservoir and the spring brake chambers, thereby providing reserve air for controlling the service brakes and releasing the spring brakes. In addition, a relay valve, located within the unit, includes a position where air in the reservoir is connected to the service brake chambers and another position where air in the service brake chambers is released to atmosphere. An electrically-actuated solenoid control assembly located within the unit includes a hold solenoid for interrupting operator brake actuation signals and a dump solenoid for releasing air pressure from the service brakes, as more fully set forth hereinafter.

BRIEF DESCRIPTION OF THE DRAWINGS

The present invention may be more clearly understood from the following detailed description of preferred embodiments read in conjunction with the accompanying drawings, wherein.

Since the FIG. 3B embodiment is so similar to the FIG. 3A embodiment in most respects, and is readily understandable to those skilled in the art in the light of the detailed description of the FIG. 3A embodiment, the descriptions of the FIG. 3B embodiment are limited hereinafter to the differences to the extent necessary.

While subtitle references to specific drawings, along with other subtitles, are employed in the following description for general orientation, it should be recognized that, under many of the subtitles, cross references to other drawings are necessarily included, particularly cross references to FIGS. 3A and 3B. Accordingly, a full understanding of any particular drawing may also require review of the description included under other subtitles.

While differences in pressure are referred to herein as causing the movement of a piston or the like, those skilled in the art recognize that it is the resulting differences in forces which cause movement. Accordingly, any difference in the effective areas upon which the respective pressures react must be taken into consideration in determining movement.

While the invention will be described in connection with the preferred embodiments of the drawings, the invention is not limited to any specific embodiment. On the contrary, the breadth of the invention covers many alternatives, modifications, and equivalents within the spirit and scope of the invention.

DESCRIPTION OF THE PREFERRED EMBODIMENTS

FIG. 1

Figure 1:
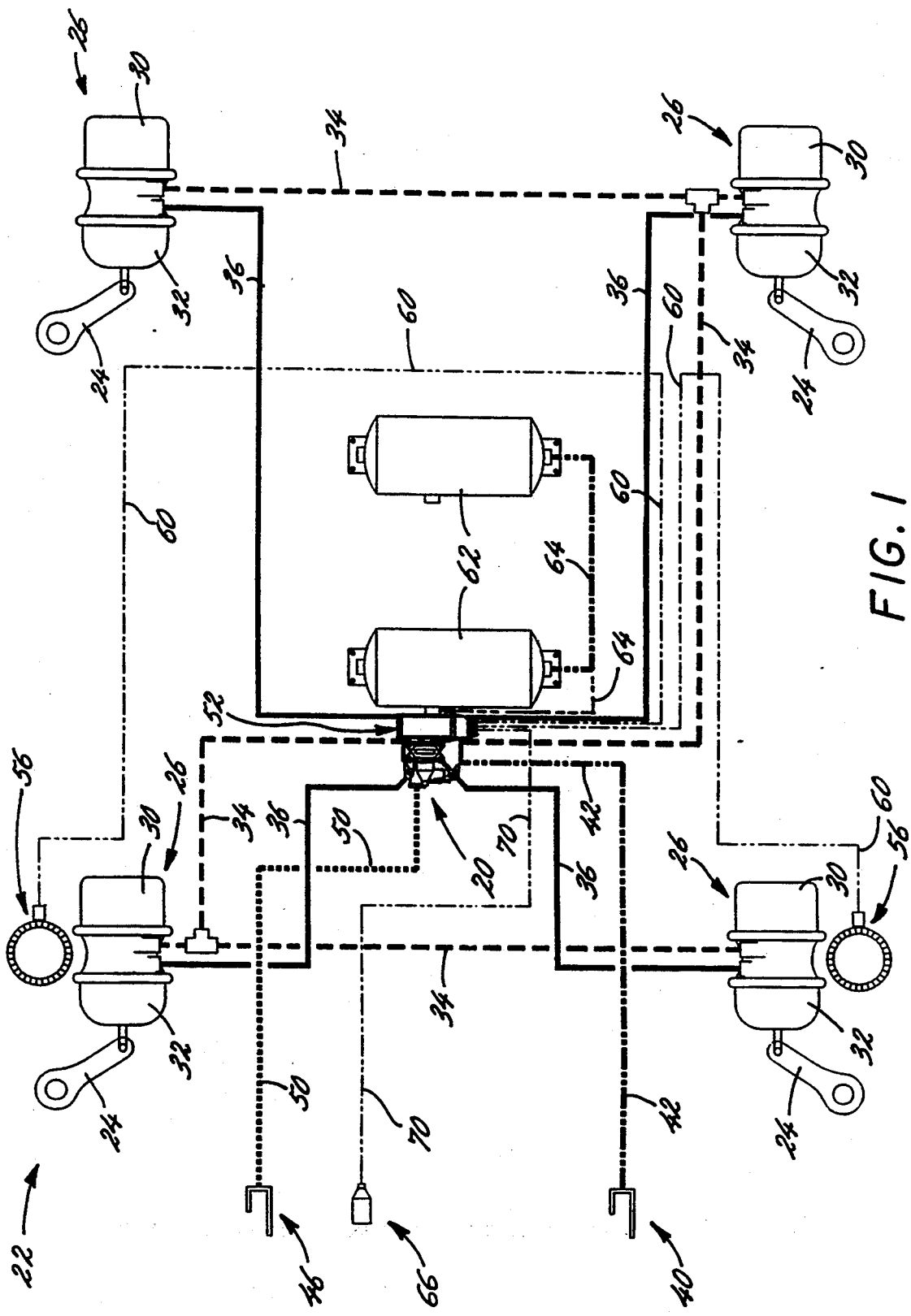
FIG. 1 is an overall air system utilizing a full function skid control valve system including the invention.

A full function skid control valve assembly 20 including the concepts of the present invention is shown in FIG. 1 as part of a vehicle braking system 22. The vehicle braking system 22 includes brake actuators 24 which are operably connected to the wheel brakes of the vehicle to apply and release the brakes. Brake actuators 24 are also connected to air brake cylinders 26 which include spring brake chambers 30 and service brake chambers 32. Pressurizing the spring brake chambers 30 releases the spring brake action of cylinders 26, sometimes referred to as releasing the spring brakes. Typically, the spring brakes are not released until sufficient air pressure is available to actuate the brakes in a service brake mode, sometimes referred to as actuating the service brakes.

Spring brake chambers 30 are fluidly connected to control valve assembly 20 via spring brake chamber air lines 34. Service brake chambers 32 are connected to control valve assembly 20 via service brake chamber air lines 36. Air from a pressurized air supply 40 is delivered to the control valve assembly 20 via air supply lines 42. The operator's brake control 46 provides a brake signal to the skid control valve assembly 20 via brake air signal line 50. Although brake control 46 can be constructed in any suitable configuration, preferably, brake control 46 comprises a pedal brake assembly.

Skid control unit 52, which is part of control valve assembly 20, is controlled based on a skid condition signal sent from the skid control sensor assemblies 56 via skid condition sensor wire 60 to the skid control unit 52. In the preferred embodiment, the skid control sensor assemblies 56 comprise electromagnetic movement sensors, although they can be of any suitable design.

To provide for ample pressurized air, vehicle braking system 22 is provided with reservoirs 62 which are connected to skid control valve assembly 20 by means of reservoir air lines 64. Preferably, a warning lamp 66 is connected to the skid control unit 52 by means of wire 70 for warning the operator of problems involving braking system 22.

FIG. 2

Figure 2:
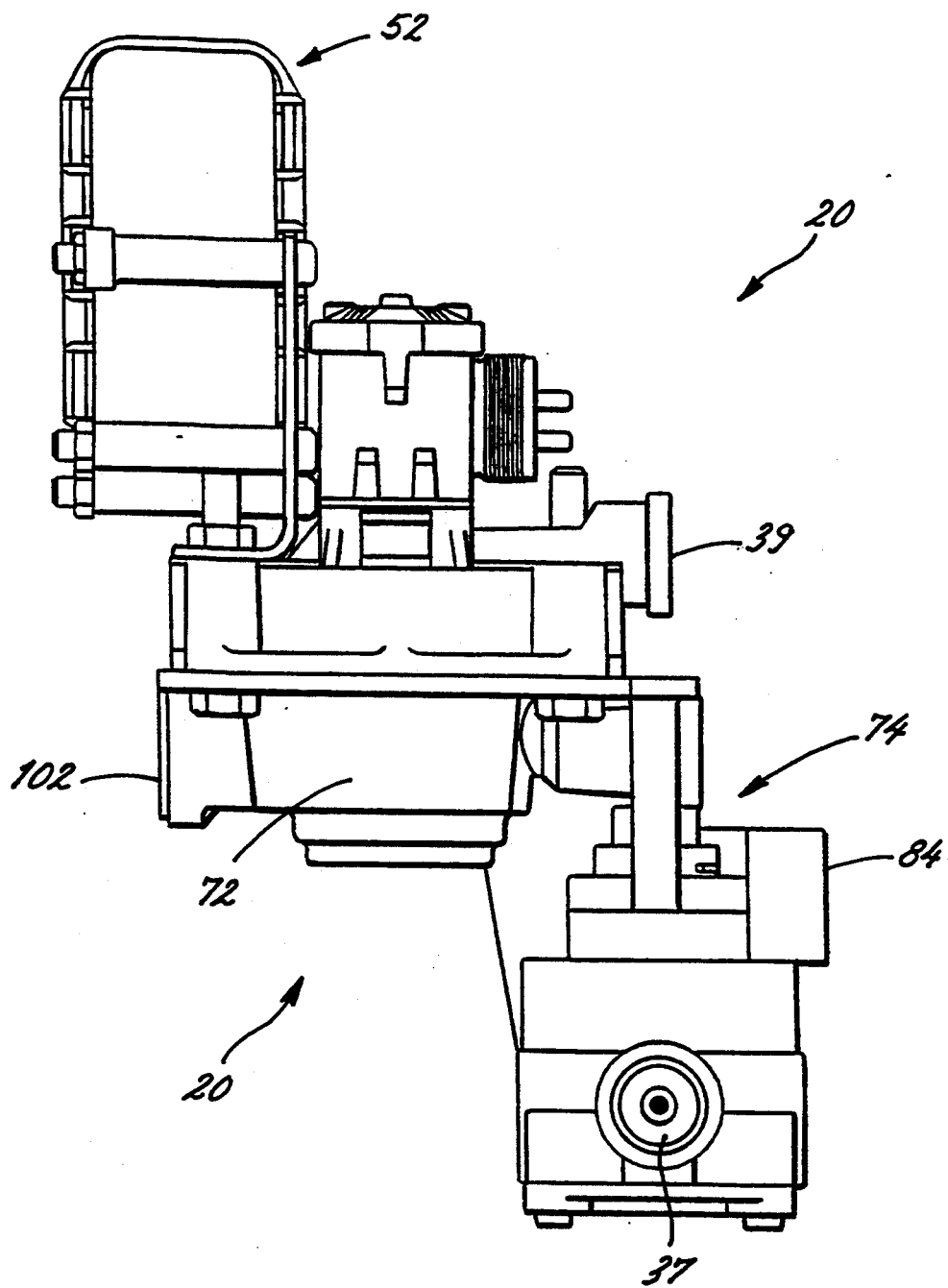
FIG. 2 is an elevational view of a valve assembly which constitutes a preferred embodiment of the invention.

The full function skid control valve assembly 20 is generally shown in FIG. 2. The multi-valve assembly 20, including the skid control unit 52, is enclosed in housing 72 thereby providing a compact and multi-functional single unit package. The housing 72 may be constructed of any suitable material, but preferably is made of a castable metal such as cast iron or aluminum. Alternatively, the housing 72 may be molded from a high strength plastic material or any other suitable material. While housing 72 may be made as a unitary piece, it is preferably made from a plurality of portions for ease in casting, machining and molding of the valve bores and conduits.

As shown in FIG. 2, assembly 20 includes spring brake control means 74 which is located within housing 72. Valve assembly 20 additionally includes supply port 84 and spring brake port 37. Supply port 84 is operatively connected to pressurized air supply 40 via air lines 42 (FIG. 1). Spring brake port is operatively connected to spring brake chambers 30 of brake actuators 26 via air lines 34 (FIG. 1). Assembly 20 further includes reservoir port 102 which is fluidly connected to reservoirs 62 via air lines 64 (FIG. 1).

Figure 3A:
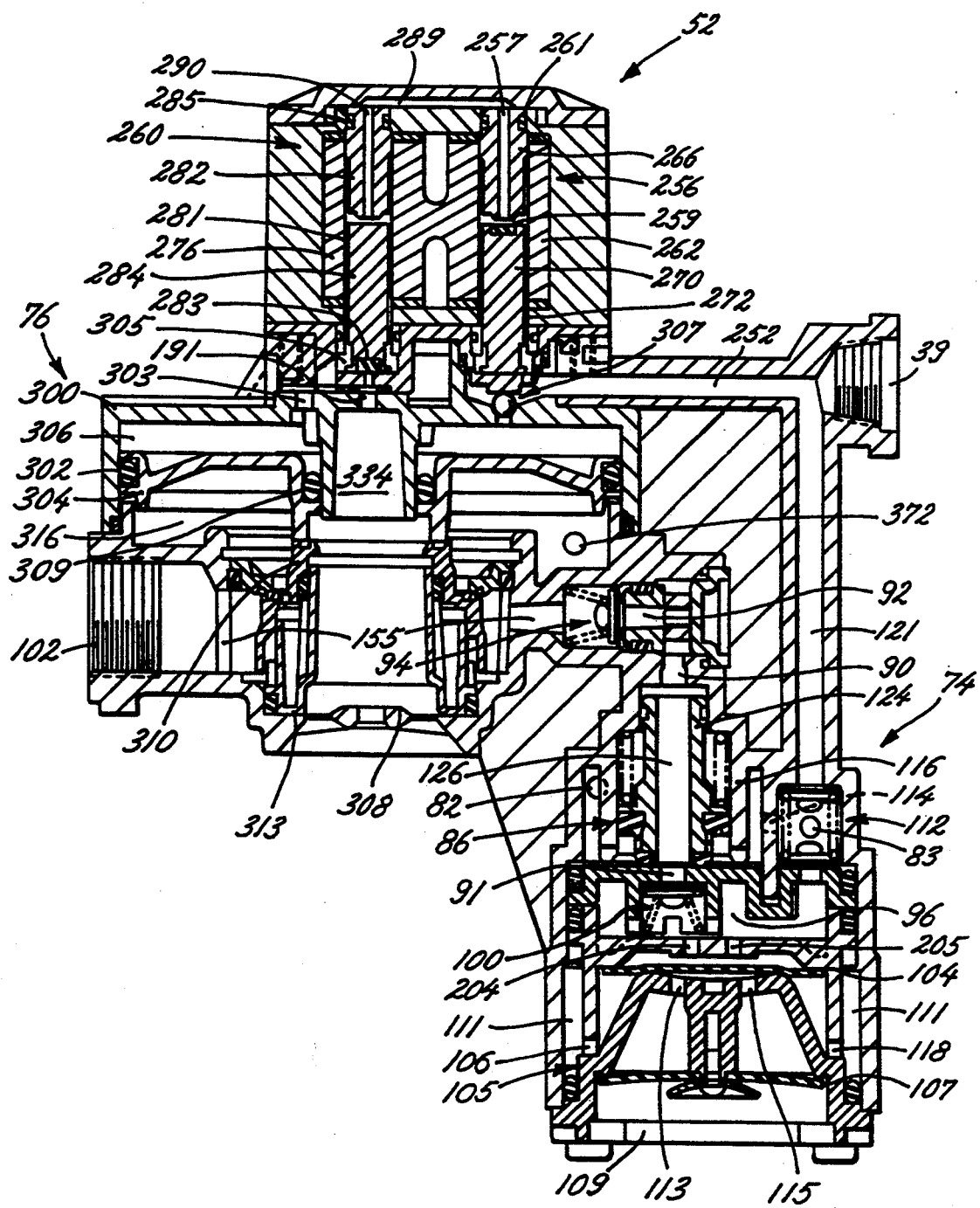
FIG. 3A is a cross sectional view of a valve assembly incorporating a preferred embodiment of the full function skid control braking system of the present invention and showing the position of the valves when subject to ambient pressure.
Figure 3B:
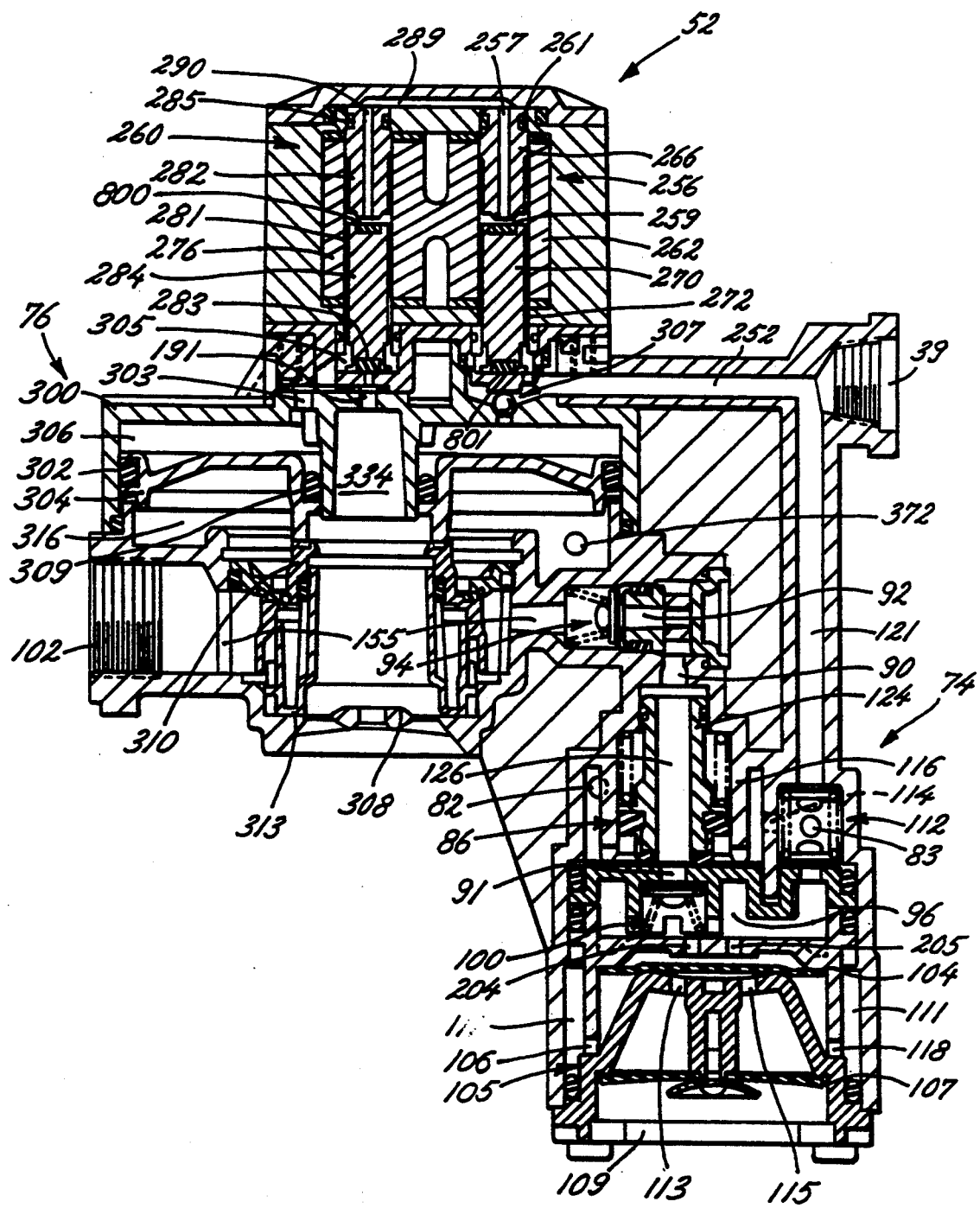
FIG. 3B is similar to FIG. 3A but shows an alternative solenoid valve design employed in the skid control unit of the valve assembly, the FIG. 3A and FIG. 3B solenoid valve designs hereinafter referred to as the FIG. 3A embodiment and the FIG. 3B embodiment, respectively.

FIGS. 3A and 3B

As shown in FIGS. 3A and 3B, spring brake control means 74 includes passages 82 and 83 which are fluidly connected to supply port 84 (FIG. 2) and pressure sensitive valve 86. Valve 86 is normally in a closed position and requires a predetermined pressure at passages 82 and 83 to open.

Valve 86 has outlets 90 and 91 which are in fluid communication with conduit 92 and check valve 100. Conduit 92 is in fluid communication with check valve 94, which is in fluid communication with reservoir port 102 via passage 155. Check valve 100 connects with conduit 96 which is fluidly connected to quick release valve 105. Valve 105 controls flow from conduit 96 to spring brake port 37 (FIG. 2) and from spring brake port 37 to exhaust port 109.

The parking or spring brakes of the vehicle, which may be of conventional design, remain applied by the action of powerful springs (not shown) which are housed in the spring brake chambers 30 (FIG. 1) until released by pressurized air through air lines 34 (FIG. 1) from spring brake port 37 (FIG. 2). To connect spring brake port 37 with conduit 96, quick release valve 105 is provided with passages 204 and 205, diaphragms 104 and 107 and passages 106 and 118, which connect to conduit 111 and spring brake port 37.

As noted, quick release valve 105 controls the flow from spring brake port 37 to exhaust port 109. To facilitate such flow, quick release valve 105 includes passages 113 and 115. The operation of quick release valve is discussed in detail hereinafter.

Besides being fluidly connected to quick release valve 105, conduit 96 communicates with double check valve 112. Double check valve 112 connects with passages 83 and 114 which fluidly connect to supply port 84 (FIG. 2). Double check valve 112 controls the flow between conduit 96 and passages 83 and 114. Under certain operating conditions, air from supply port 84 (FIG. 2) is permitted into conduit 96 via pressure sensitive valve 86 and check valve 100 while double check valve 112 remains closed.

Under certain other operating conditions, however, air may flow from conduit 96 through double check valve 112 and into passages 83 and 114. In particular, when the pressure in conduit 96 exceeds the pressure at passages 83 and 114, air is permitted to flow from conduit 96 into passages 83 and 114. In addition, double check valve 112 may permit air to flow from control port 39 to passages 83 and 114 under certain similar circumstances, such as when air supply pressure is lost.

Unless there is sufficient air pressure to operate the service brakes utilizing the service brake chambers 32, the spring brakes are not released. Thus, valve 86 is preferably a pressure sensitive valve which will permit flow only when the pressure is at least a chosen level, e.g., about 70 psi. If the pressure at valve 86 exceeds the particular chosen level, then air is permitted to flow to spring brake chambers 30 for releasing the spring brakes. Any suitable normally-closed valve may be utilized as pressure protection valve 86.

A detailed discussion of the operation of the skid control unit 52 for both FIG. 3A and FIG. 3B embodiments is set forth hereinafter under the FIG. 6 subtitle. The operation is also schematically reflected in the air logic principles of FIGS. 13A and 13B.

FIG. 4

Figure 4:
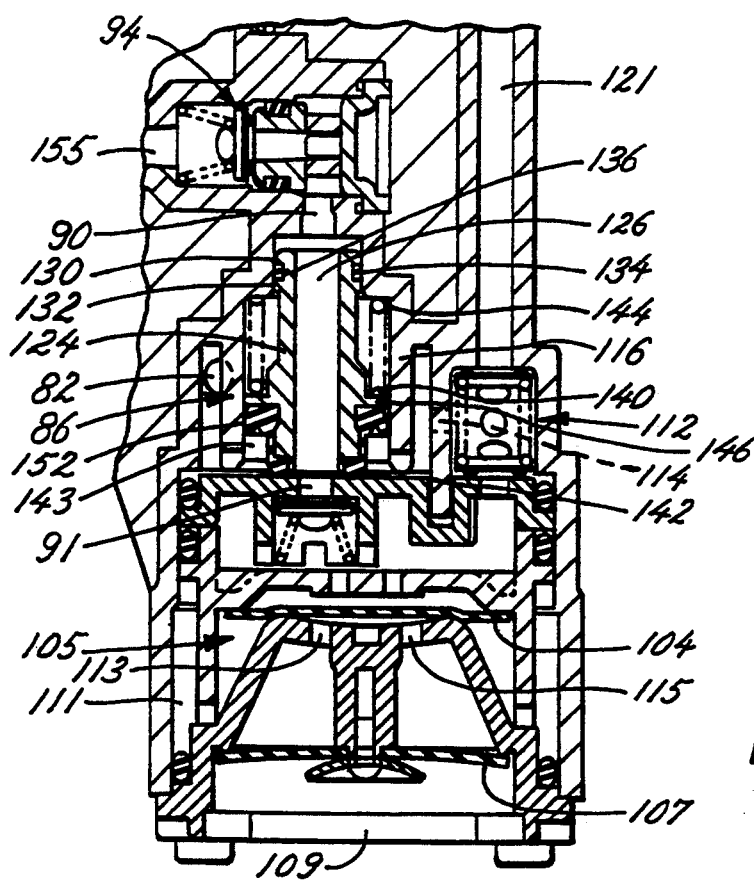
FIG. 4 is a partial cross sectional view of the spring brake control portion of the valve assembly when subject to ambient pressure.

As shown in FIG. 4, valve 86 includes housing portion 116 and piston 124. Piston 124 fits in sliding engagement partially within a large cylindrical bore of housing portion 116. A space 143 is defined between housing portion 116 and piston 124, which is in fluid communication with passages 82 and 114.

In order to provide for the opening and closing of valve 86, piston 124 is preferably reciprocating. Piston 124 may have any suitable shape, but preferably includes a hollow passage 126. To guide the reciprocating piston 124 axially in housing portion 116, piston 124 includes exterior surface portion 130 which slidably engages interior surface 132 of housing portion 116. To prevent fluid flow between interior surface 132 of housing portion 116 and exterior surface portion 130 of piston 124, a seal 134 is provided. In the preferred configuration, seal 134 comprises an O-ring located in external groove 136 of piston 124. Seal 134, however, may be made in any suitable configuration.

In order to prevent flow of insufficiently pressurized air to spring brake chambers 30 (FIG. 1), valve 86 includes biasing means 140 which biases it to a closed position. Biasing means 140 may take any suitable form such as a helical spring. As shown, biasing means 140 fits within the cavity defined by piston 124 and housing portion 116. To provide reactive surfaces for biasing means 140, housing portion 116 includes surface 144, which extends substantially perpendicular to the movement of piston 124, and reciprocating piston 124 includes collar 146. By placing biasing means 140 between surface 144 and collar 146, piston 124 is forced towards a sealing position, thereby preventing the flow of air to passage 126 and outlets 90 and 91.

Figure 5:
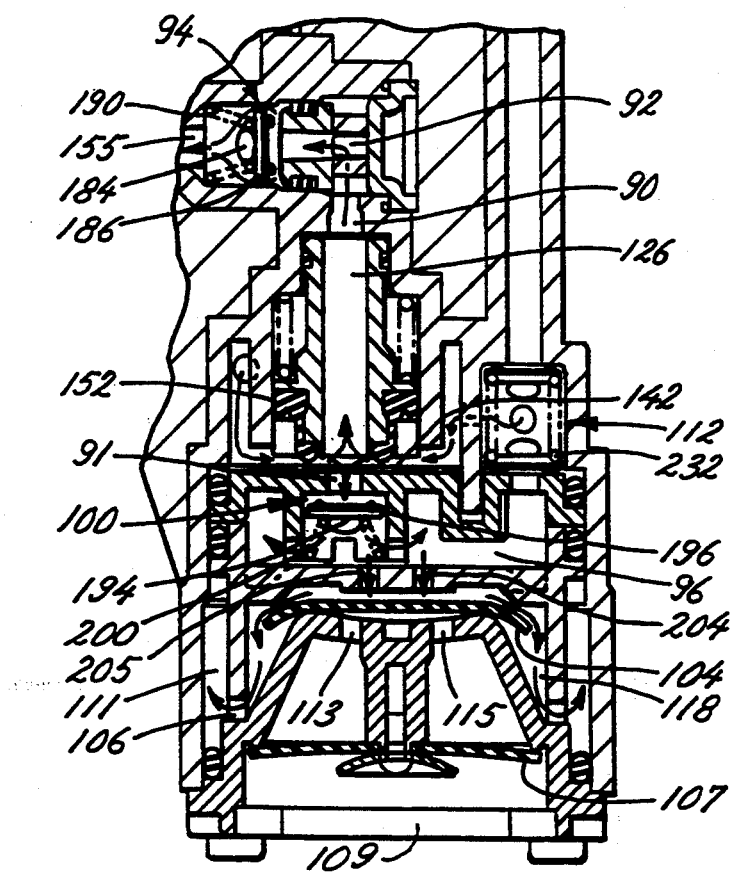
FIG. 5 is a partial cross sectional view of the spring brake control module showing the valves as the reservoir and spring brake chambers are being filled with air from the air supply.

Piston 124 is provided with seal means 152 to seal the space between passage 126 and space 143 which is in communication with the air supply. Seal means 152 may be of any suitable configuration, but preferably comprises a lip seal that includes a lip portion which contacts interior surface 142 and a circumferential portion which contacts housing 116. In order for air to flow from the air supply through valve 86 to spring brake chambers 30, the air supply pressure must counteract the biasing of piston 124 and raise the piston 124 from its lower position (FIG. 4) to its biased position (FIG. 5). In the biased position, air may flow from the air supply, through the space between seal means 152 and interior surface 142, into passage 126.

To fill reservoirs 62 (FIG. 1), air flows through passage 126, outlet 90, conduit 92, check valve 94 (opened under the pressure of the air as shown in (FIG. 5) and passage 155 to reservoir port 102 (FIG. 3). Reservoir port 102 allows air to flow to reservoirs 62 via conduit 64 (FIG. 1). One-way check valve 94 (FIGS. 3A, 3B and 4) prevents the back flow of air from reservoirs 62 into conduit 92.

FIG. 5

As shown in FIG. 5, check valve 94 may be of any suitable configuration, but preferably comprises a conical valve seat 186 within an integral ball 184 for locating valve 94 concentrically to conduit 92. Valve seat 186 is biased into sealing against the surface at the end of conduit 92 by valve seat spring 190. The spherical ball 184 is biased toward valve seat 186 by suitable means (not shown). Check valve 94 permits flow from conduit 92 into passage 155 when the pressure within conduit 92 is greater than the pressure within passage 155, but prohibits flow from passage 155 to conduit 92, even when the pressure in passage 155 is greater than the pressure in conduit 92.

As additionally shown in FIG. 5, check valve 100 is provided at outlet 91 to permit air flow into spring brake chambers 30 under certain operating conditions. As noted, when air pressure at outlet 91 exceeds the pressure in conduit 96, check valve 100 opens to permit air flow into conduit 96. Any suitable valve may be used to accomplish the purpose of check valve 100. Preferably, check valve 100 is comprised of a spherical ball 194 which is integral to the conical valve seat 196. Valve seat 196 is biased into sealing contact with the surface at the end of outlet 91 by valve seat spring 200. When the pressure at outlet 91 is greater than the pressure in conduit 96, the conical valve seat 196 breaks its seal and air is permitted to flow from the outlet 91 into conduit 96. Because of the configuration of check valve 100, air is not permitted to flow from conduit 96 to outlet 91 in normal circumstances, even if the pressure in conduit 96 is greater than the pressure at outlet 91.

To control the flow of air from conduit 96 to spring brake chambers 30, quick release valve 105 is provided. When the pressure at passages 204 and 205 is greater than the pressure at passages 106 and 118 on the other side of the diaphragm 104, diaphragm 104 of valve 105 deflects downwardly at its outer ends, thereby allowing air to flow as shown in FIG. 5. The air flows from conduit 96, through passages 204 and 205, around diaphragm 104, through passages 106 and 118 and into conduit 111. As noted above, conduit 111 is in fluid communication with spring brake port 37 (FIG. 2) and, therefore, air is ultimately permitted to flow into spring brake chambers 30 of the brake cylinders 26 (FIG. 1). Diaphragm 104 may be constructed of any suitable pliable material, but is preferably made of a plastic or rubber material.

FIG. 6

Figure 6:
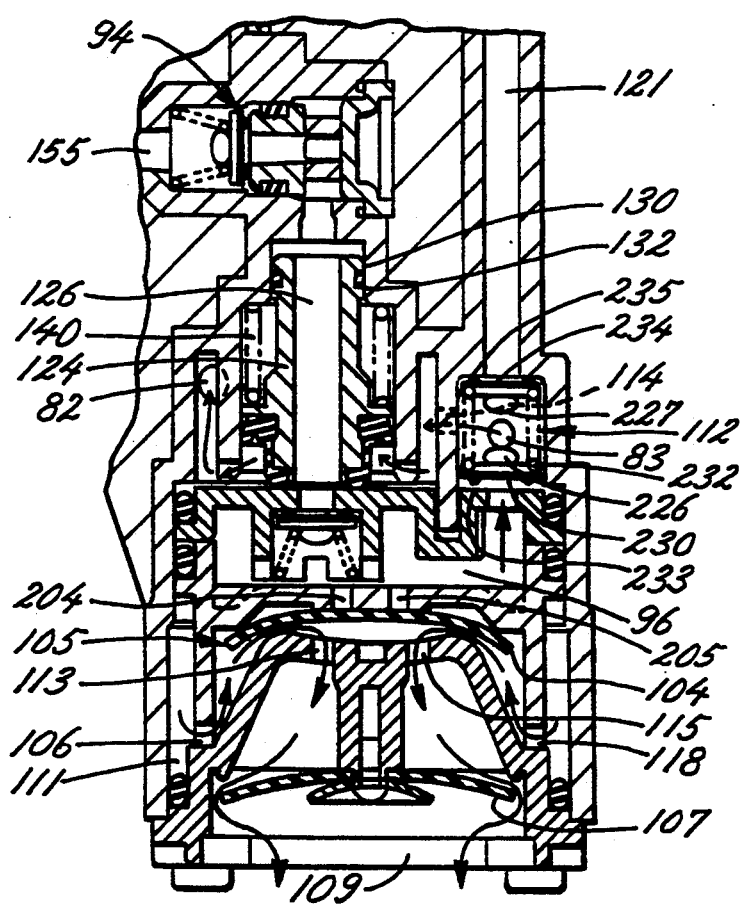
FIG. 6 is a partial cross sectional view of the spring brake control module when the spring brake chambers are being exhausted.

As shown in FIG. 6, when the pressure at passages 204 and 205 is less than the pressure at passages 106 and 118, diaphragm 104 of valve 105 will deflect upwardly and allow fluid communication between passages 106 and 118 and passages 113 and 115. In turn, diaphragm 107 deflects to allow the pressure at passages 113 and 115 to escape past diaphragm 107 and exhaust port 109 into atmosphere. Diaphragm 107 additionally prevents the flow of ambient pressured air in the reverse direction. Diaphragm 107 may be made of any suitable pliable material, but is preferably made of a flexible plastic or rubber material. Accordingly, valve 105 provides for the quick release of pressure from spring brake chambers 30 to enable the spring braking mechanism of brake system 22 to engage the brakes when the system pressure falls below predetermined levels.

In order to prevent actuation of the brakes by both the mechanism controlled by spring brake chambers 30 and the mechanism controlled by service brake chambers 32, brake system 22 provides for the release of system pressure upon decreased supply pressure. If the pressure at the supply port 84 (FIG. 2) and consequently in passages 82, 83 and 114 decreases below the pressure in a conduit 96, then double check valve 112 opens to permit air to flow from conduit 96 to supply port 84. As with other check valves, double check valve 112 opens when the pressure at passages 83 and 114 is a less than the pressure in either conduit 96 or conduit 121, or both. Double check valve 112 permits flow from conduit 96 into passages 83 and 114 when the pressure in conduit 96 exceeds the supply pressure.

Double check valve 112 includes a biasing means 232 (preferably a helical spring) which urges valve seat 230 into sealing contact with surface 233 and valve seat 234 into sealing contact with surface 235. Double check valve 112 also includes two spherical balls 226 and 227 which are integral with valve seats 230 and 234, respectively, to locate each valve seat. Each of balls 226 and 227 is urged into sealing engagement with its respective valve seat by biasing means (not shown). Although a particular configuration has been disclosed for double check valve 112, it may be of any suitable configuration.

FIG. 6 additionally shows that if the pressure in conduit 121, which communicates with control port 39 (FIG. 3), exceeds the pressure at passage 83 and 114, then double check valve 112 will open to allow air to flow from conduit 121 past double check valve 112 and into supply port 84. Thus, pressurized air at control port 39 and in conduit 121 may be permitted to escape through double check valve 112 under certain circumstances. Thus, when pressure from spring brake chamber 30 is permitted to escape out exhaust port 109, thereby engaging the spring brake mechanism, air pressure in conduit 121 and 96 will be permitted to escape via the air supply.

Turning back to FIG. 3A, skid control unit 52 located in the upper portion of housing 72 works in conjunction with relay valve 76 located in the central portion of housing 72 to control the service brakes. Conduit 252 connects control port 39, to which the operator's brake control 46 is connected via brake air supply line 50 (FIG. 1) to skid control unit 52. The operator sends a signal from brake control 46 through control port 39 to regulate when the service brakes are applied in normal operating conditions.

Skid control unit 52 may take on any suitable form within the scope of the invention. It preferably includes hold solenoid valve 256 and dump solenoid valve 260.

Hold solenoid valve 256 is an electromechanical device which includes solenoid 262 for converting electric signals into magnetic fields. Hold solenoid valve 256 preferably includes stationary upper portion 266 and axially slidable lower portion 270. It includes bore 272 into which both upper portion 266 and lower portion 270 fit. Lower portion 270 includes grooves along the entire length of its outer circumference in the axial direction. The axial grooves permit air to flow along the perimeter of lower portion 270, while locating lower portion 270 within bore 272. Upper portion 266 similarly includes grooves along its circumference, except the grooves do not extend its entire length as do the grooves of lower portion 270. Near the top of upper portion 266, seal 261 is provided to prevent unintended air flow. Seal 261 may take on any suitable configuration but preferably is a ring seal. Through the center of upper portion 266 of hold solenoid valve 256, there is bore 257 which permits the flow of air under certain circumstances.

As shown, lower portion 270 includes seal 259 which forms a seal at the lower end of bore 257 when actuated. When such seal is made between the upper portion 266 and lower portion 270, air is not permitted to flow through hold solenoid valve 256.

Still referring to FIG. 3A, like hold solenoid valve 256, dump solenoid valve 260 is an electromechanical device which includes solenoid 276 for converting electric signals into magnetic fields. Dump solenoid valve 260 preferably includes stationary upper portion 282 and an axially slidable lower portion 284. It includes bore 281 into which upper portion 282 and lower portion 284 fit. Lower portion 284 of dump solenoid valve 260 includes axial grooves around its circumference which extend its entire length.

In contrast to lower portion 270, rather than having a seal at its upper end, lower portion 284 includes seal 283. In the unactuated position, seal 283 abuts against the opening leading to outlet 191 and thereby prevents fluid communication between space 305 and outlet 191. Similarly to upper portion 266 of hold solenoid valve 256, upper portion 282 includes axial bore 290 which extends its length and provides a passageway through which air may pass in certain circumstances. Portion 282 also includes seal 285 which prevents air from flowing along the perimeter of portion 282.

Referring to the FIG. 3B embodiment, the alternate solenoid design consists of having seals on both ends of the axially slidable lower portion 270 and 284 of hold solenoid 256 and dump solenoid 260, respectively. Accordingly, as shown in FIGS. 3B, 7B, 8B, 9B, 10B, 11B, 12B and 15B, hold solenoid 256 has seals 259 and 801 at the upper and lower ends, respectively, and dump solenoid 260 has seals 283 and 800 at the lower and upper ends, respectively.

As in the FIG. 3A embodiment, hold solenoid valve 256 and dump solenoid valve 260 of the FIG. 3B embodiment are electromechanical devices which include solenoids for converting electric signals into magnetic fields. Thus, for example, dump solenoid valve 260 preferably includes stationary upper portion 282 and an axially slidable lower portion 284. Lower portion 284 of dump solenoid valve 260 includes axial grooves around its circumference which extends its entire length. As already indicated, it has seals 800 and 283 at its upper and lower ends, respectively. In the unactuated position, seal 283 abuts against the opening leading to outlet 191 and thereby prevents fluid communication between space 305 and outlet 191.

The upper portion 282 of the dump solenoid valve 260 includes an axial bore 290 which extends its length and provides a passageway through which air may pass in certain circumstances. As shown in FIG. 3B, lower portion 284 includes seal 800 at its upper end, which forms a seal at the lower end of bore 290 when actuated.

When such seal is made between the upper portion 256 and lower portion 270 of hold solenoid valve 256, air is not permitted to flow through dump solenoid valve 260. Portion 282 also includes seal 285 which prevents air from flowing along the perimeter of portion 282.

As will be apparent to those skilled in the art, energization of the hold and dump solenoids of skid control unit 52 depends in part on the particular embodiment chosen, such as the FIG. 3A embodiment or FIG. 3B embodiment. With the FIG. 3A embodiment, for example, the solenoids are energized together, that is, the solenoids are fired in parallel. With the FIG. 3B embodiment, the solenoids may be fired either in parallel or in series, the latter referring to a sequence wherein the dump and hold solenoids are never energized at the same time. The latter sequence can be advantageous should minimization of simultaneous current flow be desired.

It should be noted that seal 801 on the lower portion 270 of hold solenoid valve 256 of skid control unit 52 in the FIG. 3B embodiment is non-functional. Seal 801 is present so that lower portion 270 is identical to lower portion 284 of dump solenoid valve 260. This reduces the number of differing parts and thus the cost of manufacturing and inventorying them. It also removes the possibility of error during assembly.

Relay valve 76 may take on any suitable form, but preferably includes housing portion 300 and movable dividing flange 304 which define chamber 306. Housing portion 300 includes passage 303 which connects chamber 306 to space 305. Housing portion 300 includes check ball valve 307 between chamber 306 and conduit 252. Check ball valve 307 can move upward into the concave surface overlying it and thus can allow air to flow from chamber 306 to conduit 252 under certain circumstances but does not permit the flow of air from conduit 252 to chamber 306. Housing portion 300 also includes outlet 191 through which air flows depending on the position of lower portion 284 and seal 283 as described above. At the center of relay valve 76, exhaust conduit 334 provides fluid communication with exhaust port 308 and atmosphere.

Flange 304 may be of any suitable configuration, but preferably is a circular flange including axial projections in which seals are provided for sealing chamber 306. Along the outer circumference of flange 304, seal 302 is provided to prevent air from leaking into chamber 316. At the center of flange 304, seal 309 is provided similarly to prevent air from escaping. Flange 304 also includes a surface which extends downwardly and contacts cylindrical piece 310.

Cylindrical piece 310 includes a seal at its upper end to seal against flange 304 when the two pieces abut. Cylindrical piece 310 extends downwardly and outwardly to contact an extension of pieces which form the remaining sealed walls that create chamber 316. Chamber 316 includes passage 372 which is in fluid communication with the service brake port (not shown) and service brake chambers 32 via air lines 36 (FIG. 1). Relay valve 76 also includes cylindrical piece 313. It fits in sealing engagement inside cylindrical piece 310 and seals against the structure of the housing and the sealing pieces of the valve to prevent passage 155 from leaking into conduit 334 and exhaust port 308.

Figure 7A:
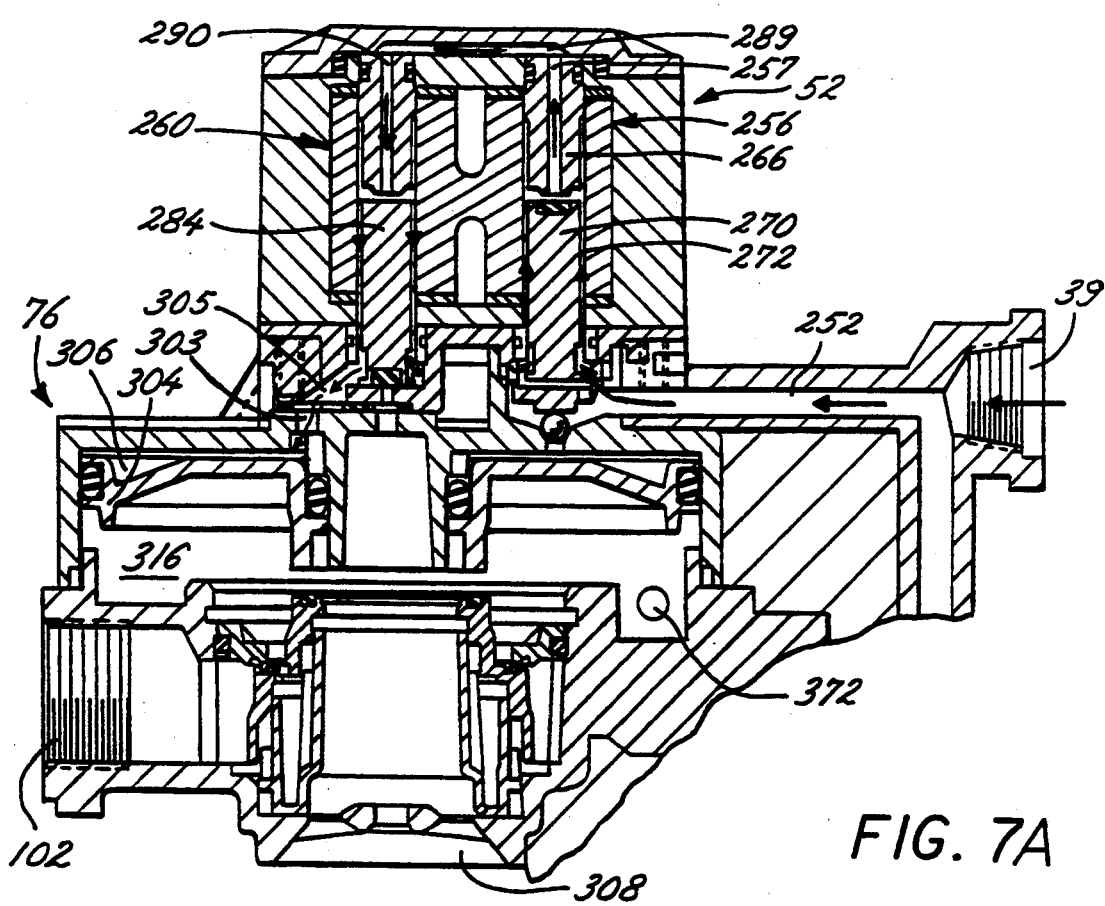
FIG. 7A is a partial cross sectional view of the FIG. 3A embodiment of the valve assembly and shows the position of the valves in the skid control unit and relay valve when the service brakes are first applied.
Figure 7B:
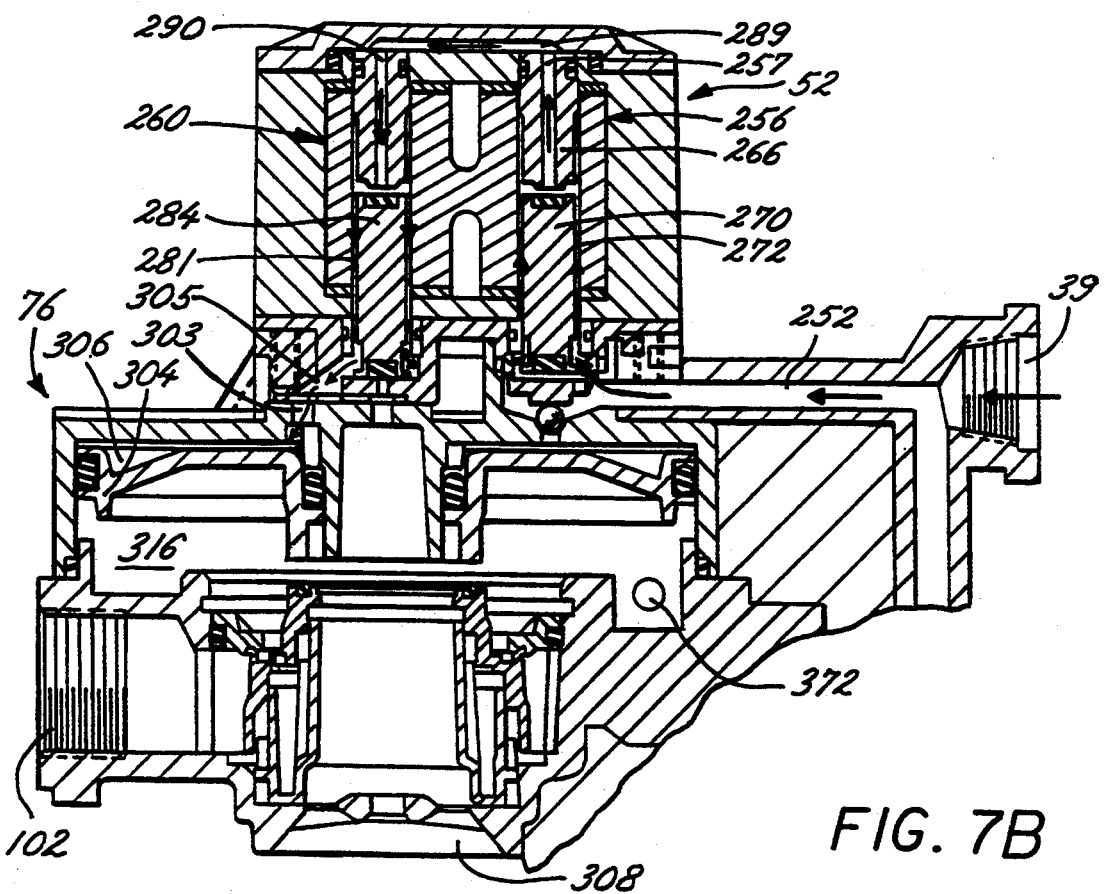
FIG. 7B is similar to FIG. 7A and shows the same situation for the FIG. 3B embodiment.

FIGS. 7A and 7B

FIGS. 7A and 7B depict the condition where the service brakes are in the disengaged position and are about to be engaged. As shown, when service brakes are not being engaged, relay valve 76 is open to permit chamber 316 to fluidly communicate with exhaust port 308 and atmosphere. Of course, as was explained earlier, passage 372 of chamber 316 communicates with service brake port (not shown), which communicates with service brake chambers 32 via air lines 36 (FIG. 1).

When the operator of the vehicle creates a braking signal by engaging brake control 46 (FIG. 1), air pressure at control port 39 rises and air flows along conduit 252. When it reaches control unit 52, whether it be the FIG. 3A or FIG. 3B embodiment, the air flows into the grooves on the outside of piston 270 and through bore 257 of upper portion 266 of hold solenoid valve 256. The air flow continues through control unit 52 along passage 289 and into bore 290 of dump solenoid valve 260. The air flow moves out of bore 290 and along the outside of lower portion 284 through passages 305 and 303 and into chamber 306.

While the pressure is maintained at control port 39 and conduit 252, chamber 306 fills with pressurized air. As chamber 306 fills with air, the force produced by the air pressure acting on the effective area begins to rise above the force produced by the air pressure acting on the effective area in chamber 316. As this occurs, flange 304 begins to move in a downwardly direction.

Figure 8A:
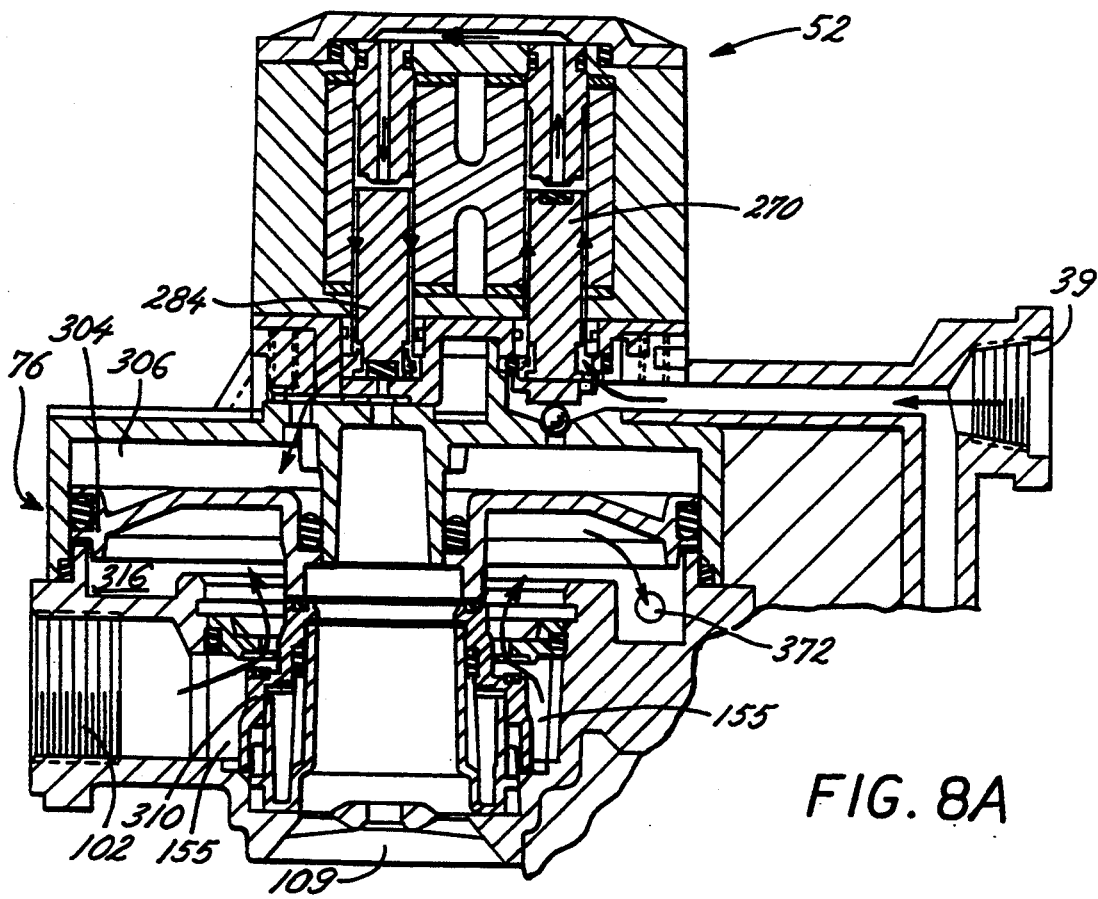
FIG. 8A is a partial cross sectional view of the FIG. 3A embodiment of the valve assembly showing the position of the valves in the skid control unit and the relay valve when the service brakes are being applied.
Figure 8B:
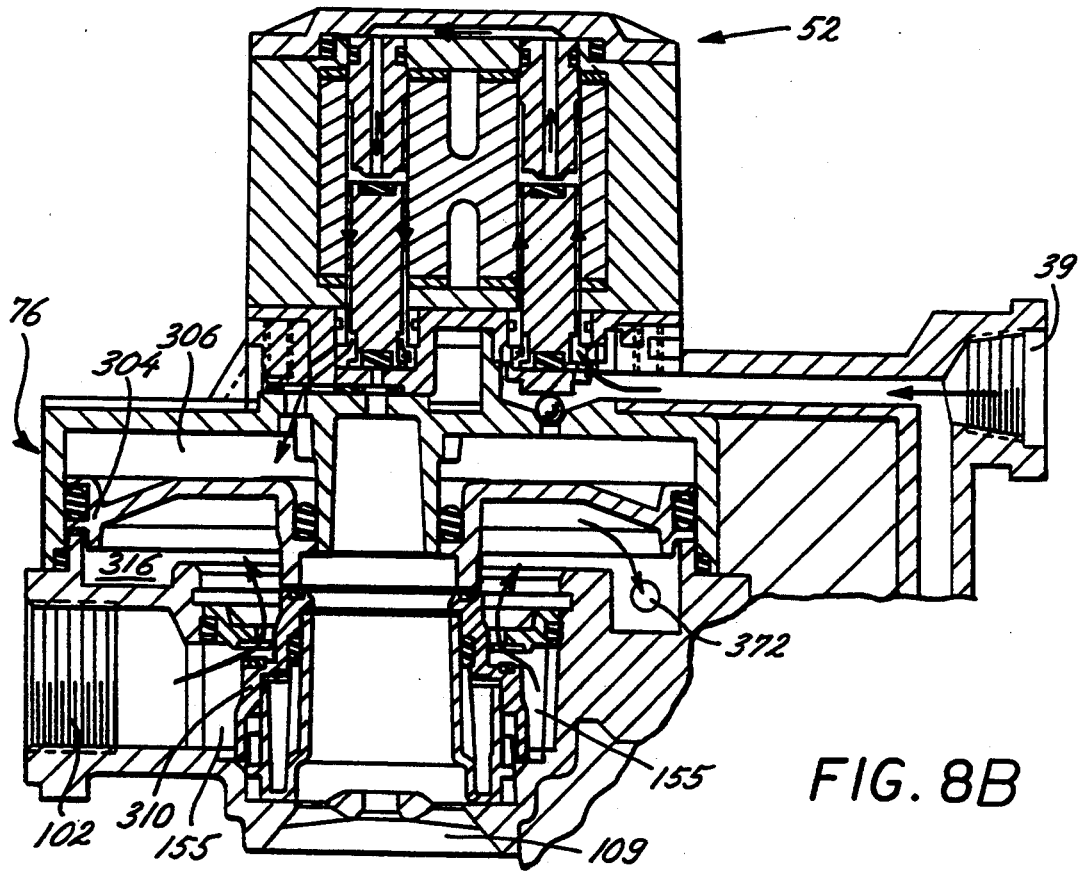
FIG. 8B is similar to FIG. 8A and shows the same situation for the FIG. 3B embodiment.

FIGS. 8A and 8B

As shown in FIGS. 8A and 8B, once chamber 306 has filled with a sufficient amount of pressurized air, flange 304 will cause the seal between piece 310 and the housing pieces to be broken. As a result, air from the reservoirs 62 and supply 40 (FIG. 1) is permitted to flow into chamber 316 and ultimately to service brake chambers 32.

As shown, air flows from passage 155 into chamber 316 and into passage 372. This establishes fluid communication with the service brake port (not shown), air lines 36 and service brake chambers 32 of brake actuators 26 (FIG. 1).

Figure 9A:
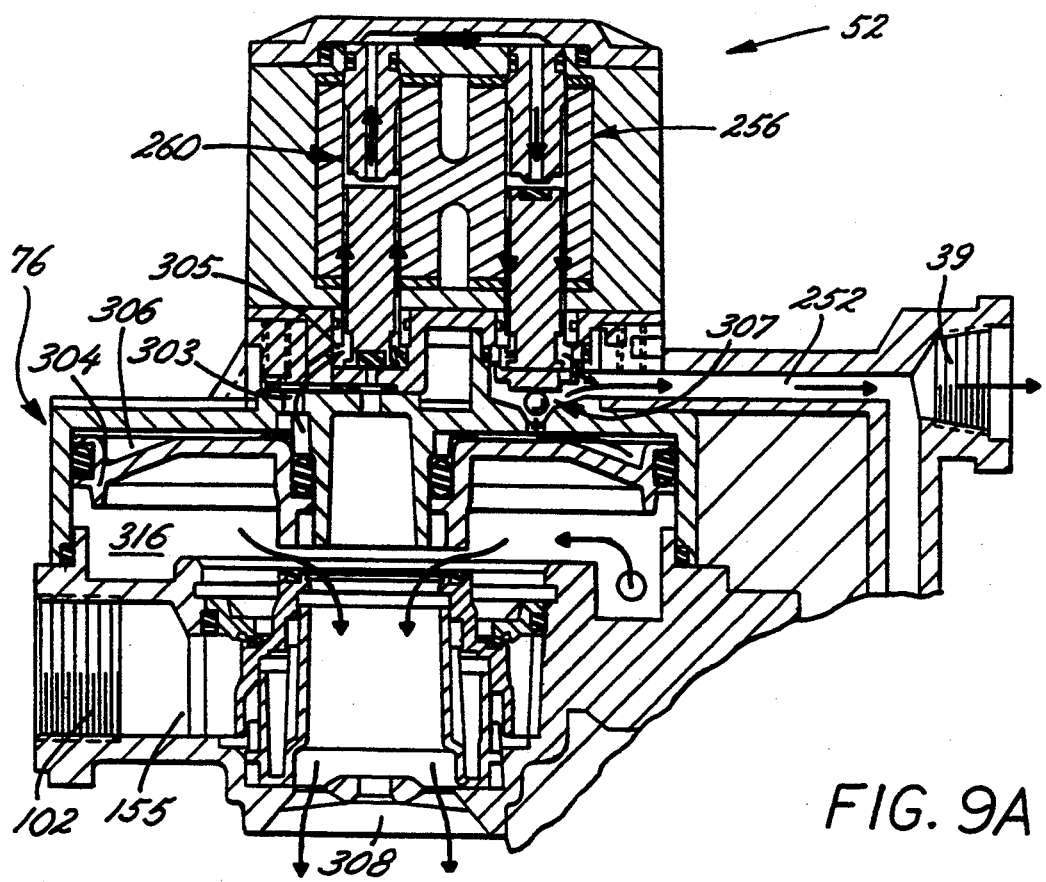
FIG. 9A is a partial cross sectional view of the FIG. 3A embodiment of the valve assembly showing the position valves in the skid control unit and relay valve when the service brakes are being released.
Figure 9B:
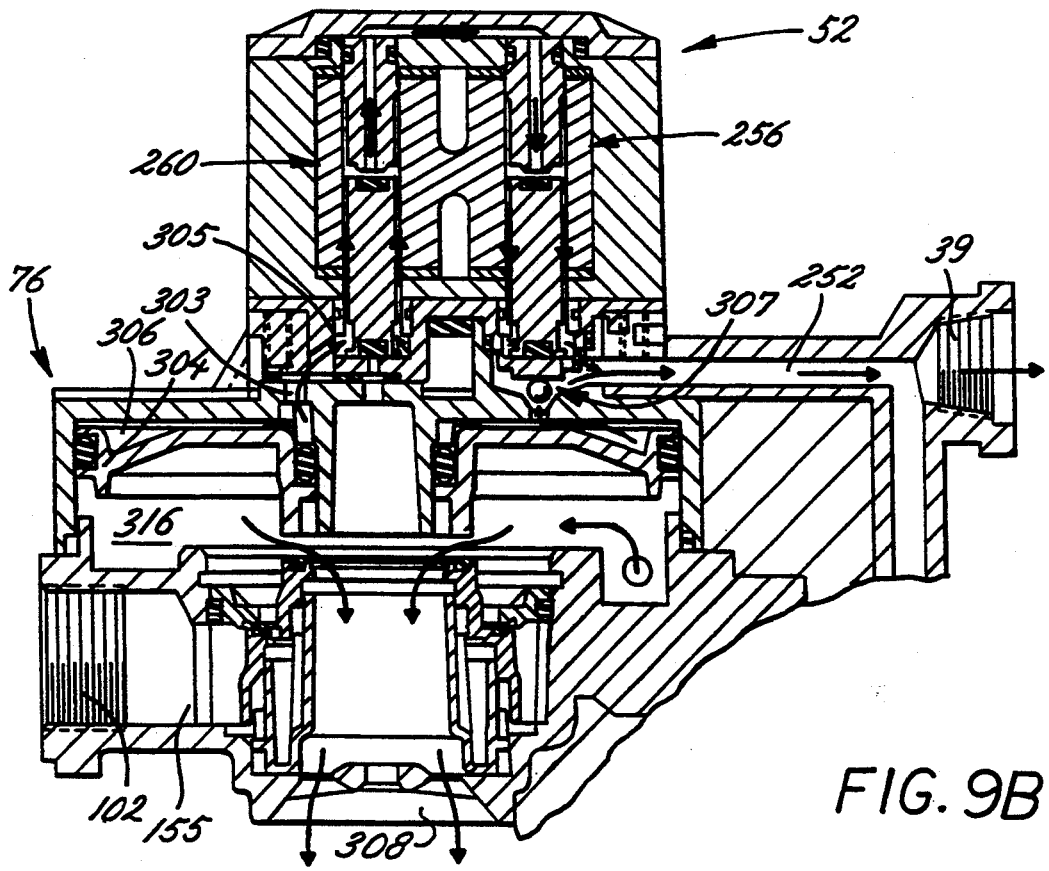
FIG. 9B is similar to FIG. 9A and shows the same situation for the FIG. 3B embodiment.

FIGS. 9A and 9B

FIGS. 9A and 9B depict the deactuation of the service brakes. As a result of the air pressure being reduced at brake control 46 (FIG. 1) by the operator, the air pressure at control port 39 is reduced. Since chamber 306 is in fluid communication with conduit 252 and control port 39, when the pressure is reduced at control port 39, air flows from chamber 306 towards control port 39. As the air flows out of chamber 306, flange 304 moves in an upwardly direction until the seal between passage 155 and chamber 316 is made. If the force due to the air pressure in chamber 306 remains lower than the force due to the air pressure in chamber 316, flange 304 will continue to move in an upwardly direction until the seal between chamber 316 and exhaust port 308 is opened and fluid communication is permitted between chamber 316 and exhaust port 308 as shown.

When the service brakes are being deactivated as a result of the operator releasing brake control 46 (FIG. 1), air flows from chamber 306 through passage 303, into space 305, past dump solenoid valve 260 and hold solenoid valve 256, and into conduit 252 which communicates with control port 39. Air also flows from chamber 306 past check ball valve 307 and directly into conduit 252. Thus, there are two paths by which air can flow from chamber 306 to conduit 252 and control port 39 when the pressure at control port 39 is less than the pressure in chamber 306 and hold solenoid 256 is not actuated.

As noted above, FIG. 8A shows the service brakes being applied. If the wheels begin to skid during this operation, control unit 52 operates to hold or dump pressure from chamber 306 and thereby controls the pressure in service brake chambers 32 (FIG. 1).

Figure 10A:
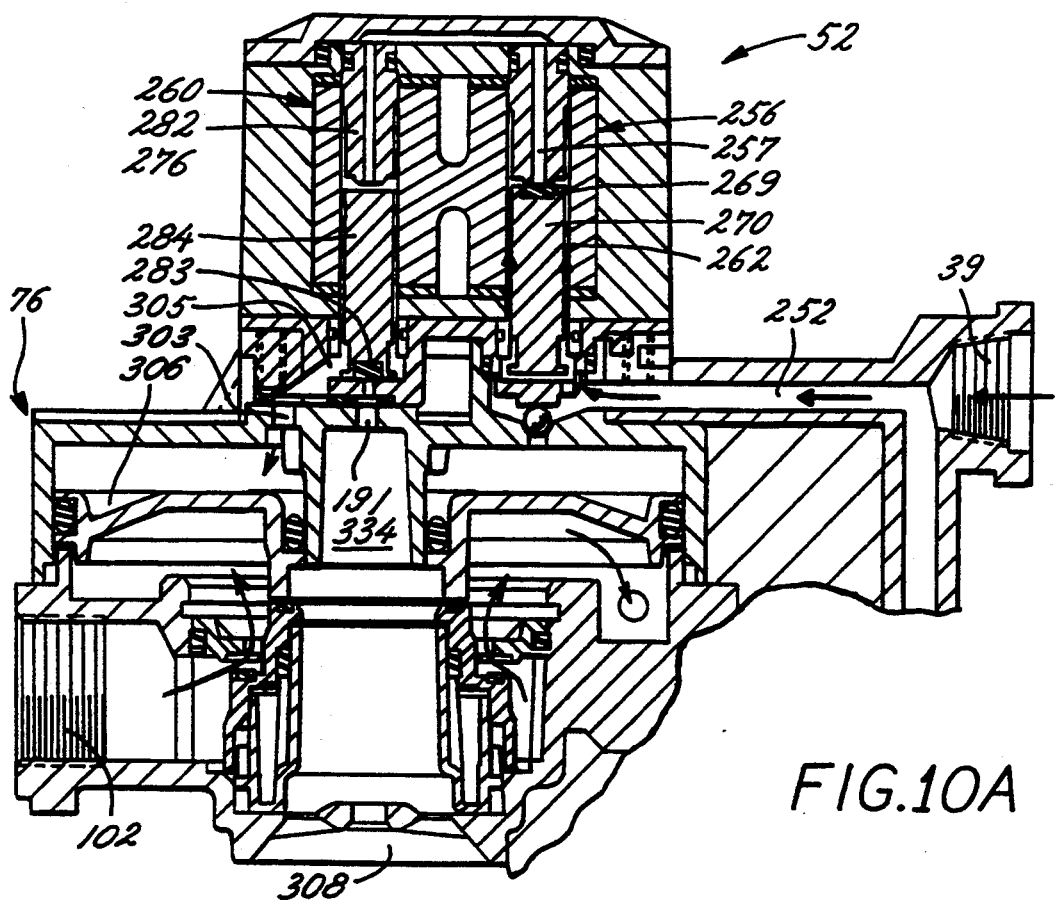
FIG. 10A is a partial cross sectional view of the FIG. 3A embodiment of the valve assembly showing the position of the valves in the skid control unit and the relay valve when the hold solenoid of the skid control unit is energized.
Figure 10B:
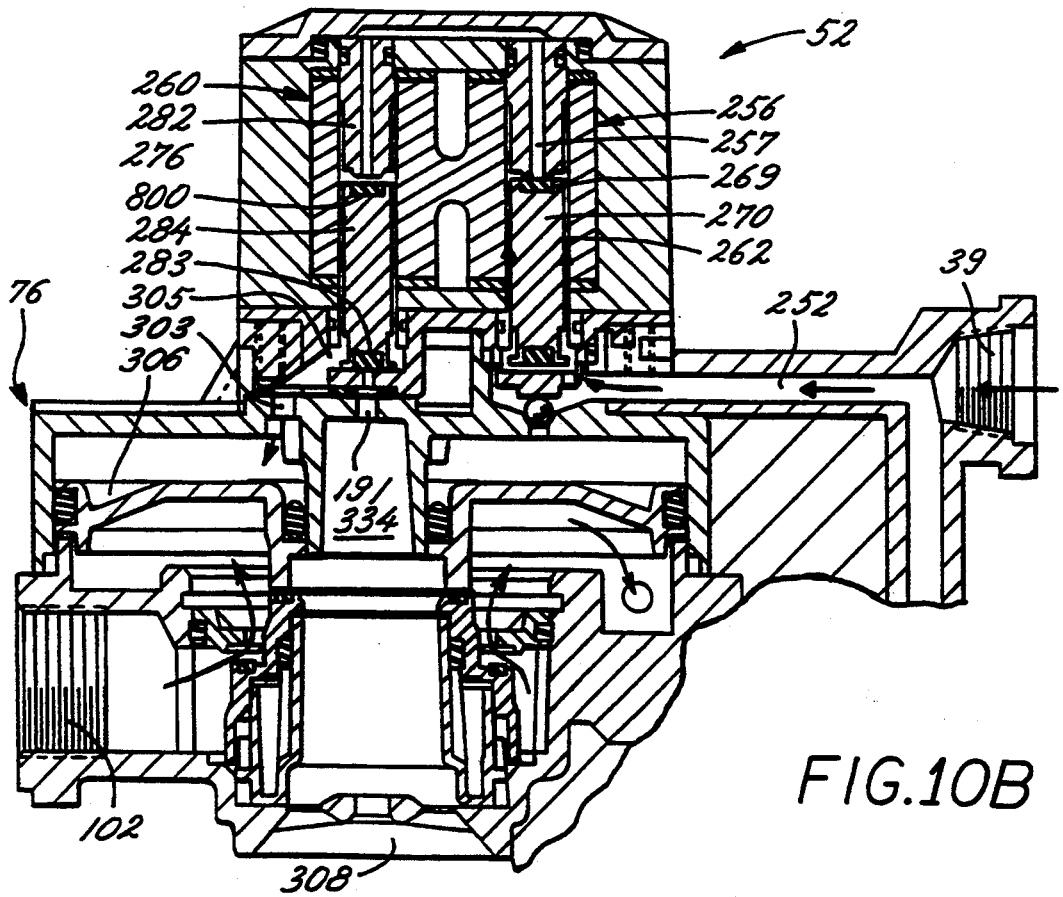
FIG. 10B is similar to FIG. 10A and shows the same situation for the FIG. 3B embodiment.

FIGS. 10A and 10B

As shown in FIG. 10A, hold solenoid valve 256 may be closed under certain conditions thereby preventing air in conduit 252 from flowing into chamber 306. Consequently, actuation of brake control 46 (FIG. 1) will not further actuate the brakes. Valve 256 is closed when solenoid 262 causes portion 270 to move in an upwardly direction until seal 259 abuts the end of bore 257. In such event, the status of relay valve 76 is maintained unless the pressure in conduit 252 drops below the pressure in chamber 306.

Also as noted above, FIG. 8B shows the service brakes being applied. If the wheels begin to skid during this operation, control unit 52 operates to hold or dump pressure from chamber 306 and thereby control the pressure in service brake chambers 32 (FIG. 1).

As shown in FIG. 10B, dump solenoid valve 260 or hold solenoid valve 256 may be closed under certain conditions thereby preventing air in conduit 252 from flowing into chamber 306. Consequently, actuation of brake control 46 (FIG. 1) will not further actuate the brakes.

Valve 260 is closed when solenoid 276 causes portion 284 to move in an upwardly direction until seal 800 abuts the end of bore 290. As a result, the pressure in 306 is permitted to escape out exhaust port 308 via passage 303, space 305, outlet 191 and conduit 334, and air in conduit 252 is prevented from flowing into chamber 306. Valve 256 is closed when solenoid 262 causes portion 270 to move in an upwardly direction until seal 259 abuts the end of bore 257. In such event, the status of relay valve 76 is maintained unless the pressure in conduit 252 drops below the pressure in chamber 306.

Hold solenoid valve 256 is actuated dependent on the signals received from sensor assemblies 56 (FIG. 1). Control unit 52 includes an electronic processing means which evaluates the signals received from assemblies 56 and determine if the wheels are rotating at the same speed. The control unit 52 uses the wheel speed information from each of the sensors to calculate a vehicle reference speed. This information is used to determine the brake release and re-apply points.

Further information as to the functioning of the electrical system which controls the hold and dump solenoid valves 256 and 260 of the skid control unit 52 will be set forth hereinafter for both the FIG. 3A and FIG. 3B embodiments. It commences with the subtitle "The ABS Algorithm".

Figure 11A:
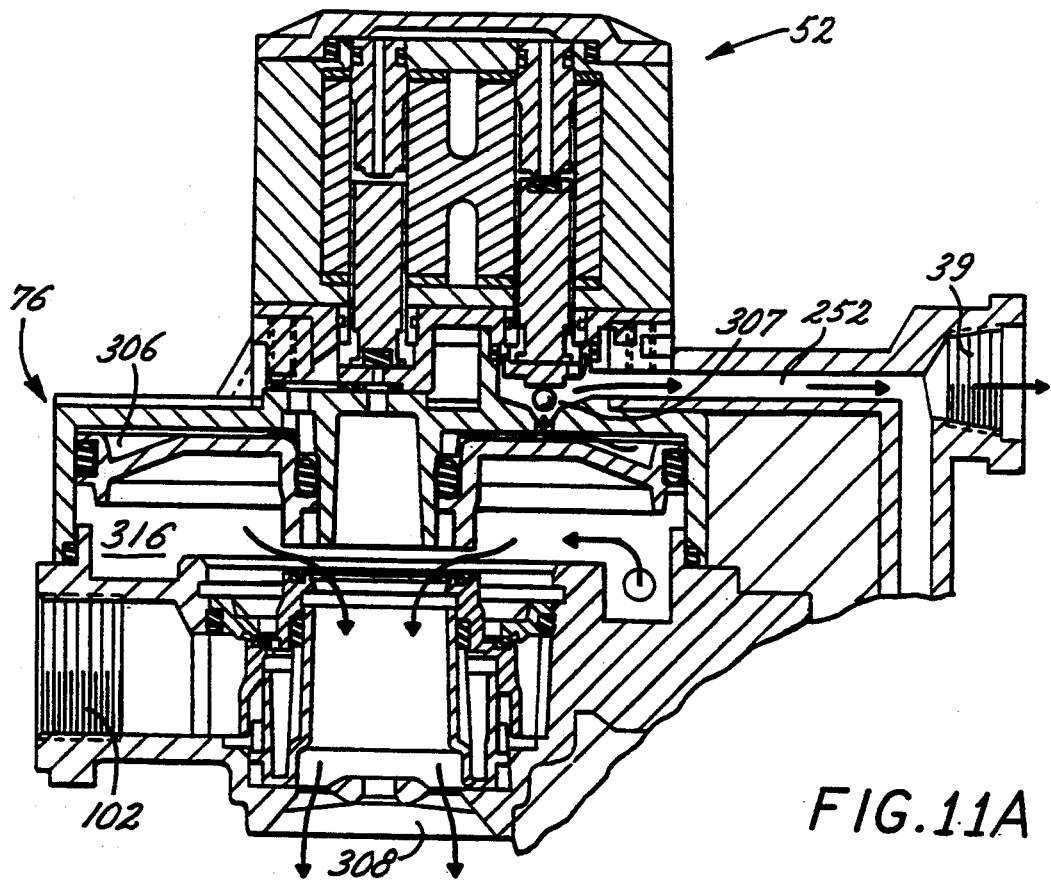
FIG. 11A is a partial cross sectional view of the FIG. 3A embodiment of the valve assembly showing the position of the valves in the skid control unit and the relay valve when the hold solenoid is energized and the operator deactuates the brake control thereby releasing the service brakes.
Figure 11B:
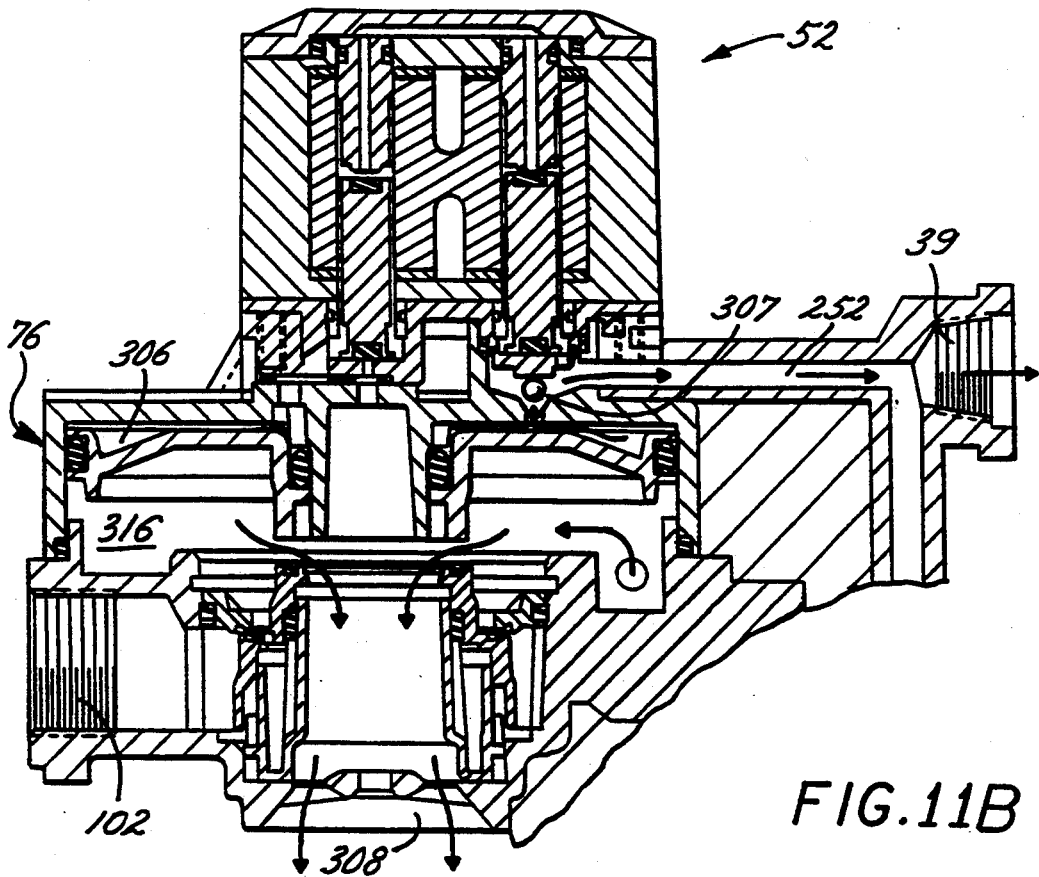
FIG. 11B is similar to FIG. 11A and shows the same situation for the FIG. 3B embodiment.

FIGS. 11A and 11B

As shown in both FIGS. 11A and 11B, if the pressure in conduit 252 drops below the pressure in chamber 306, air will flow through check valve 307 to the extent necessary to equalize the pressure in chamber 306 with the pressure in conduit 252. Of course, as the pressure in chamber 306 is reduced, flange 304 moves upwardly until chamber 316 is permitted to fluidly communicate with exhaust port 308. Thereby, the service brakes may be either partially or entirely deactuated.

Figure 12A:
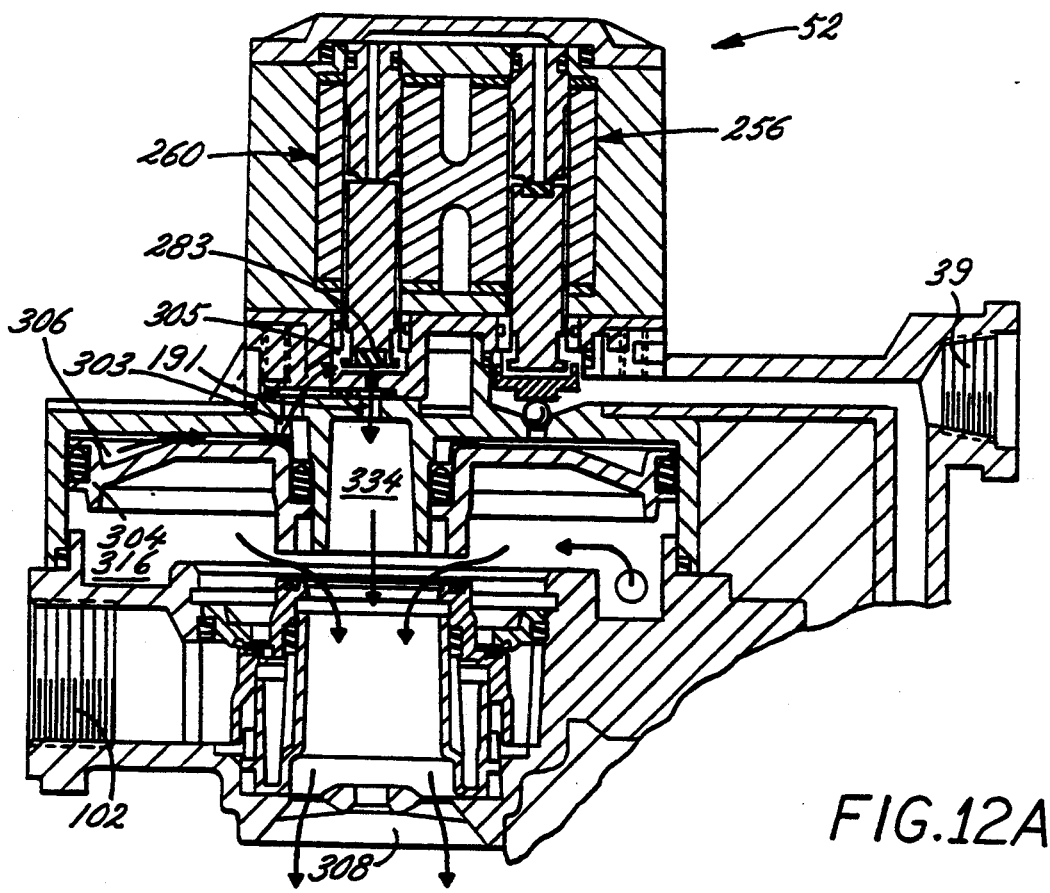
FIG. 12A is a partial cross sectional view of the FIG. 3A embodiment of the valve assembly showing the position of the valves in the skid control unit and the relay valve when dump solenoid and hold solenoid are energized thereby releasing the service brakes.
Figure 12B:
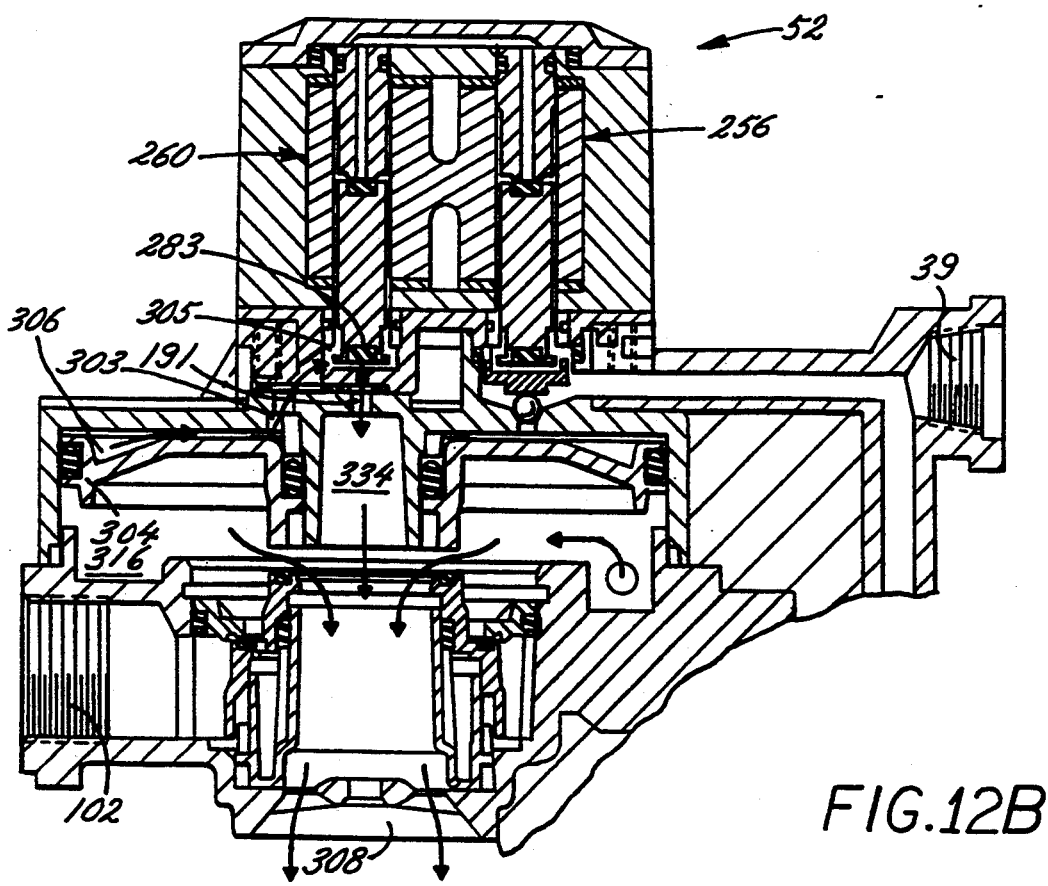
FIG. 12B is similar to FIG. 12A and shows the same situation for the FIG. 3B embodiment.

FIGS. 12A and 12B

For the FIG. 3A embodiment, FIG. 12A depicts the situation as described above where control unit 52 releases the service brakes automatically. As shown, hold solenoid valve 256 is closed and dump solenoid valve 260 is actuated. In such a situation, seal 283 ceases abutting contact with the passage leading to outlet 191, conduit 334 and exhaust port 308. As a result, the pressure in chamber 306 is permitted to escape out exhaust port 308 via passage 303, space 305, outlet 191 and conduit 334. Again, as the pressure leaves chamber 306, flange 304 moves upwardly until the seal between chamber 306 and exhaust port 308 is opened. Consequently, the pressure in chamber 316 ultimately is permitted to escape through exhaust port 308 to atmosphere, resulting in the service brakes being released.

For the FIG. 3B embodiment, FIG. 12B depicts the situation as described above where control unit 52 releases the service brakes automatically. As shown, dump solenoid valve 260 is actuated. The results are the same as in the FIG. 3A embodiment.

Figure 13A:
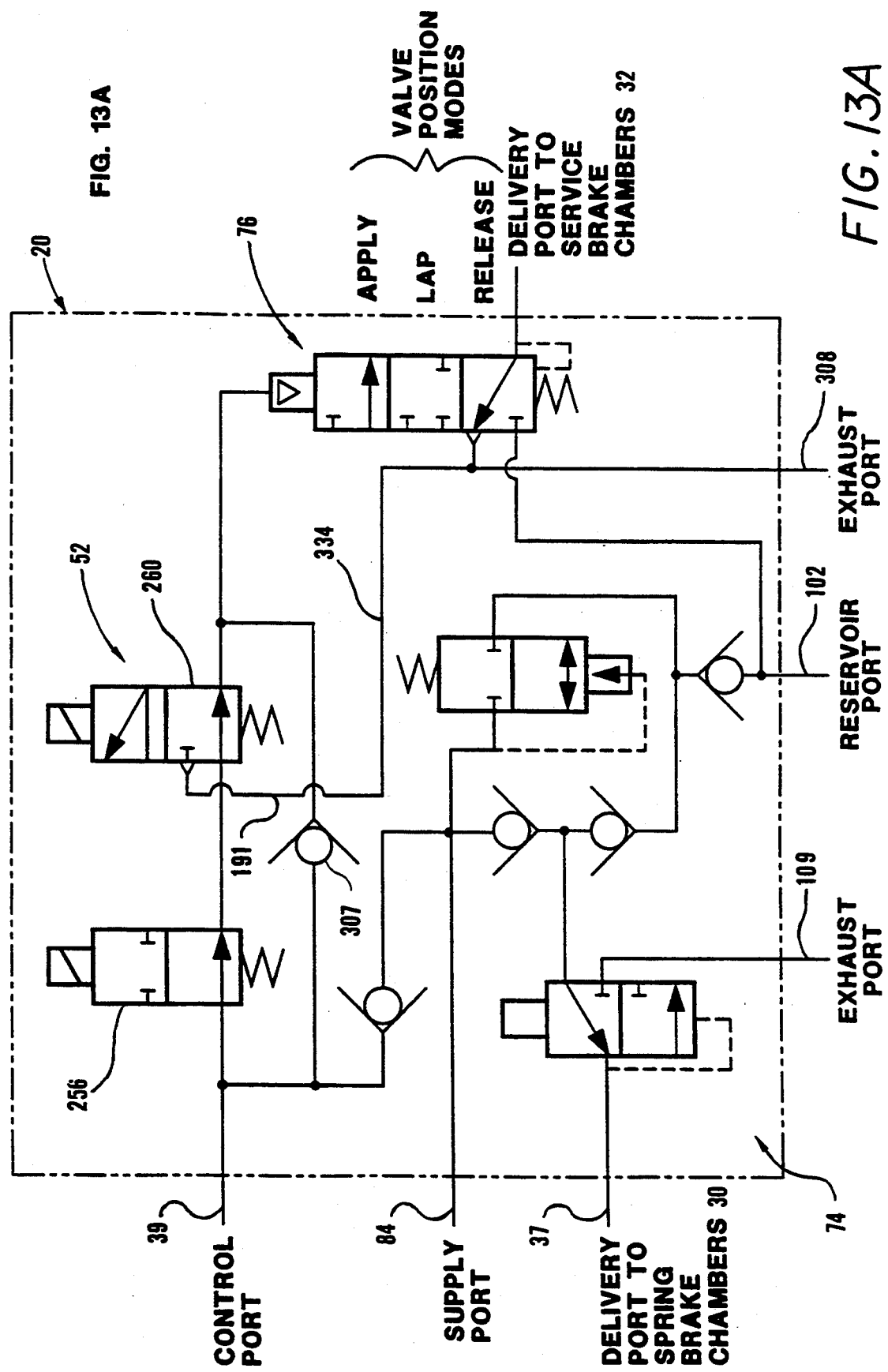
FIG. 13A is a schematic of the air logic principles corresponding to the FIG. 3A embodiment of the invention.
Figure 13B:
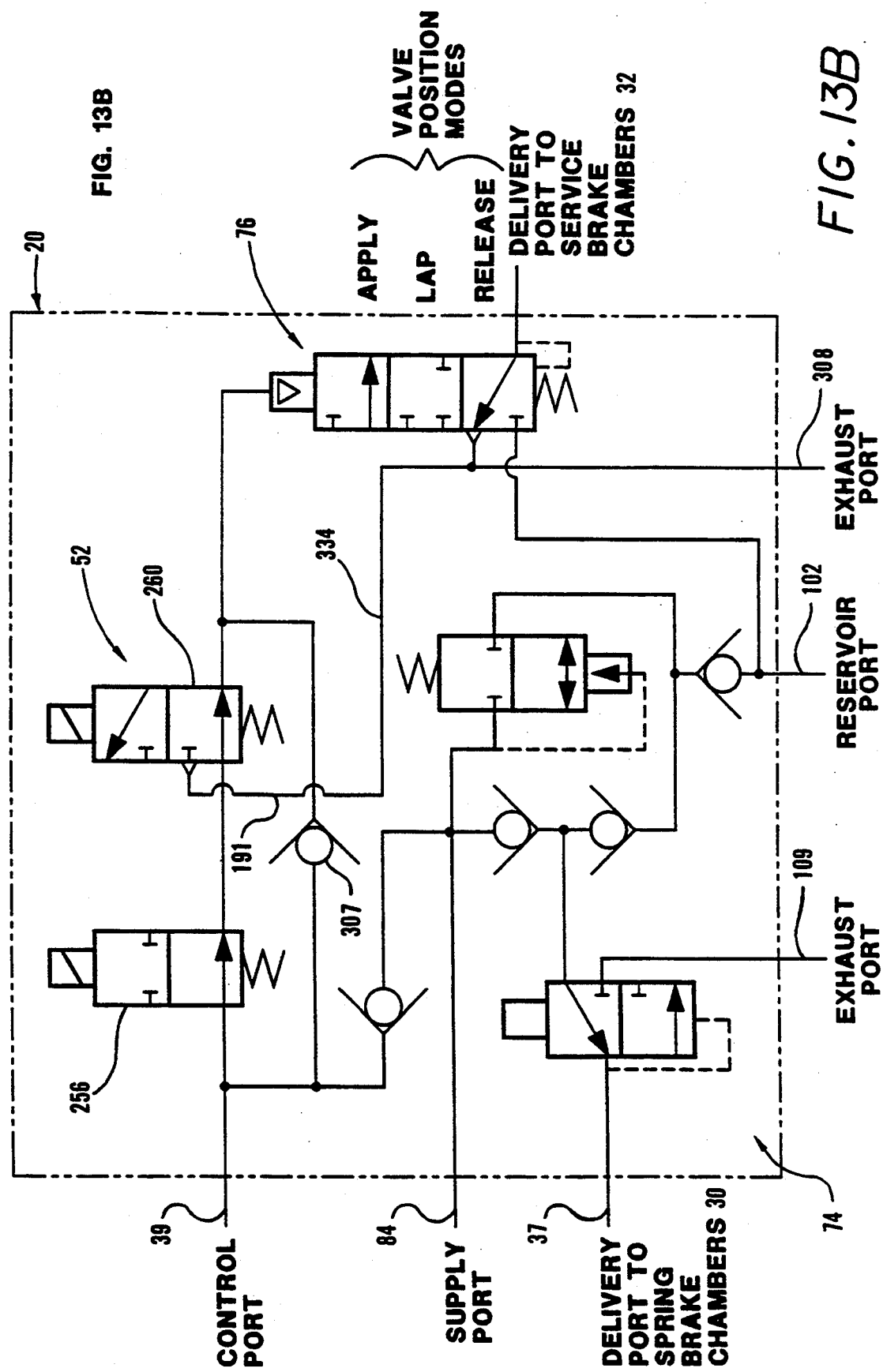
FIG. 13B is similar to FIG. 3A and schematically shows the air logic principles corresponding to the FIG. 3B embodiment.

FIGS. 13A and 13B

FIGS. 13A and 13B show schematic diagrams of valve assembly 20 in brake system 22 for the FIG. 3A and FIG. 3B embodiments, respectively. The upper portions of the schematic drawings depict the function of control unit 52. Relay valve 76 is schematically depicted in the righthand portion of the drawings. Spring brake control means 74 is schematically depicted in the lower lefthand portion of the drawings.

The specific operation of both embodiments which are schematically portrayed is readily apparent to those skilled in the art in the light of the detailed description of the physical embodiments already set forth.

FIGS. 14, 15A, 15B and 16

Figure 14:
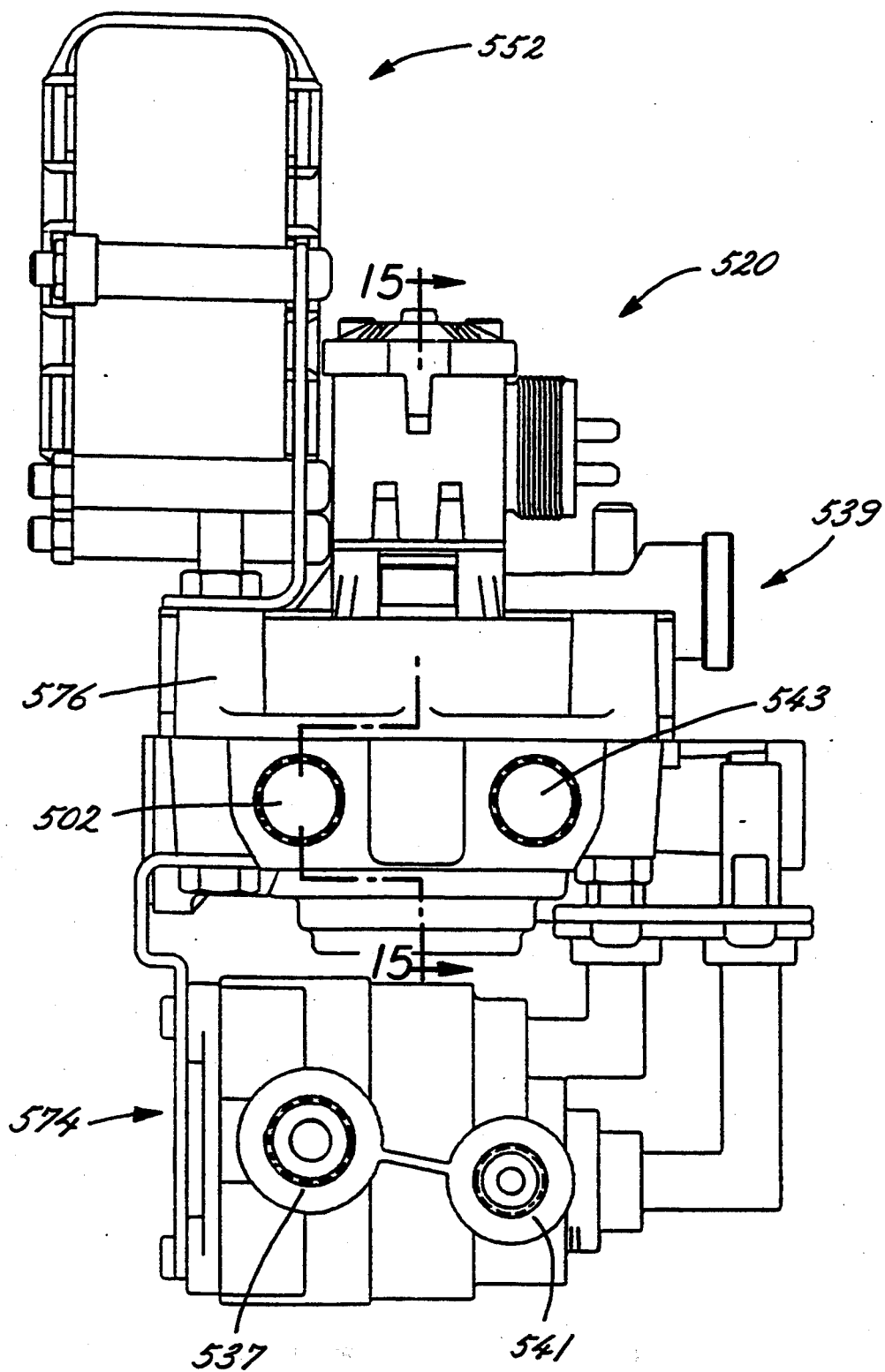
FIG. 14 is an elevational view of a valve assembly which constitutes another preferred embodiment of the invention.

FIGS. 14, 15A, 15B and 16 show another preferred embodiment of the invention. As shown in FIG. 14, full function skid control valve assembly 520 is housed within housing 572 and includes skid control unit 552, spring brake control means 574 and relay valve 576. Assembly 520 also includes control port 539, spring brake port 537, supply port 541, reservoir port 502 and service brake port 543 and associated internal components.

Figure 15A:
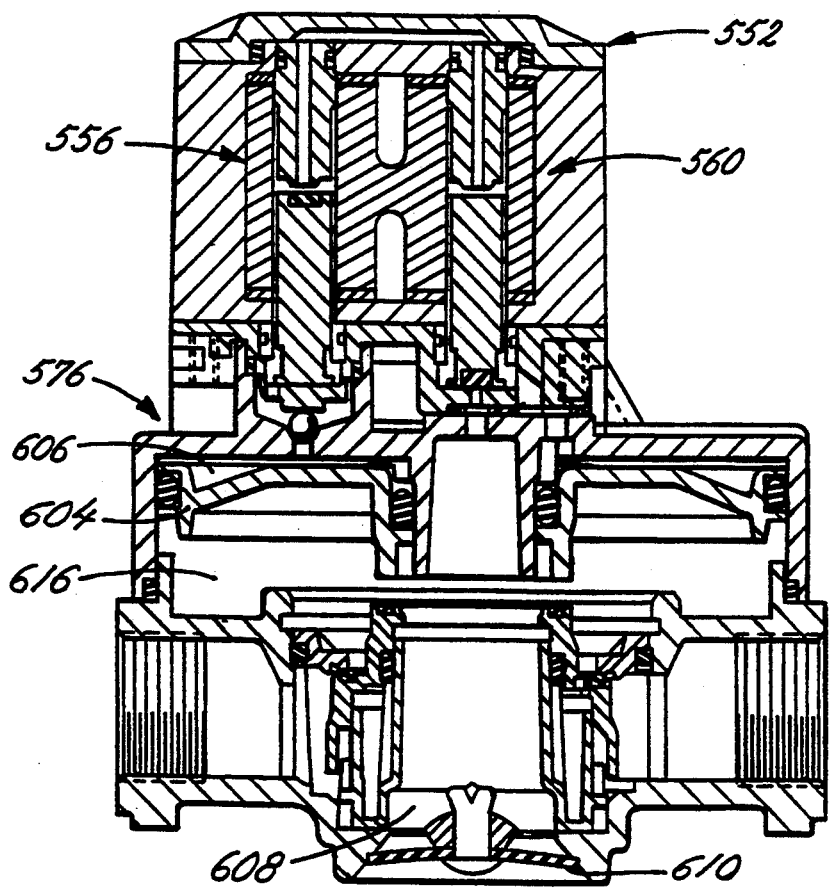
FIG. 15A is a cross sectional view of the FIG. 14 embodiment taken along lines 15—15 of FIG. 14 and incorporating the solenoid valve design of the FIG. 3A embodiment.
Figure 15B:
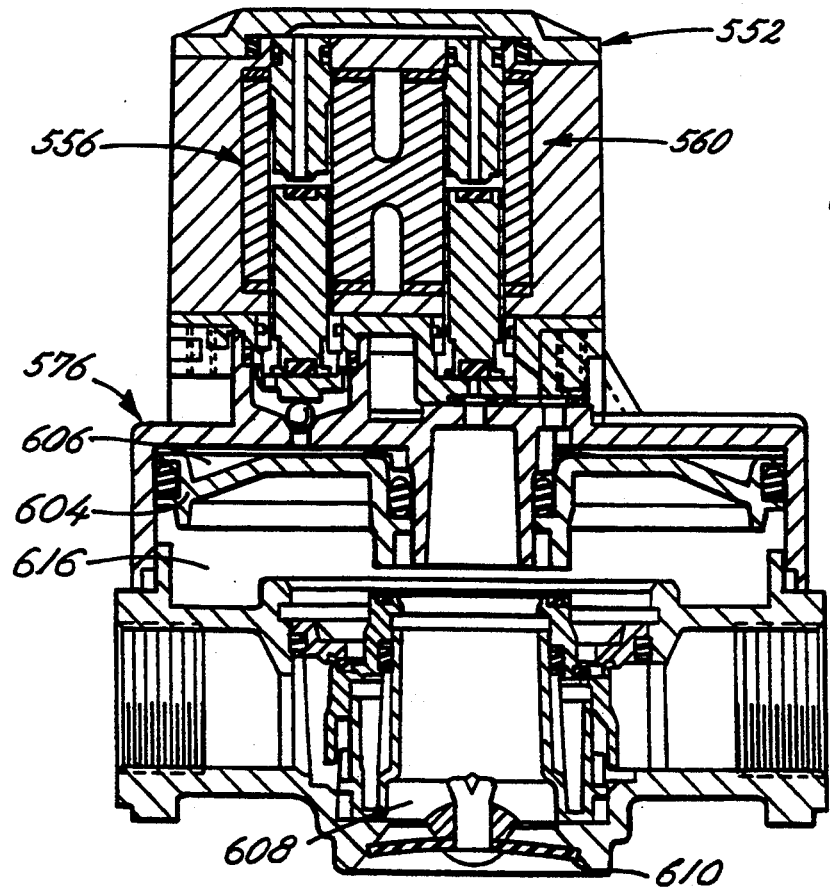
FIG. 15B is a cross sectional view of the FIG. 14 embodiment taken along lines 15—15 of FIG. 14 and incorporating the solenoid valve design of the FIG. 3B embodiment.

As shown in FIGS. 15A and 15B, control unit 552 includes hold solenoid valve 556 and dump solenoid valve 560 in similar fashion to the preferred embodiments of FIGS. 1-12. In addition, relay valve 576 is provided with movable flange 604, chambers 606 and 616, and exhaust port 608. As shown, exhaust port 608 includes diaphragm 610 which prevents ambient air from flowing into exhaust port 608.

Figure 16:
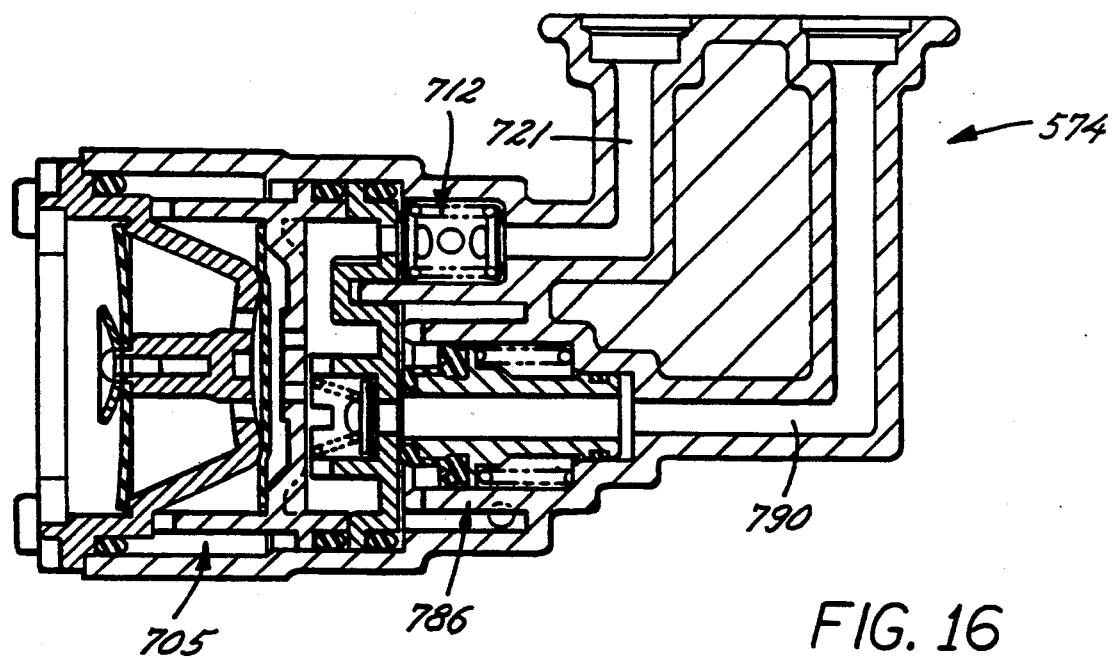
FIG. 16 is a partial cross sectional view of the valve assembly showing the position of the valves in the spring brake control module of the FIG. 14 embodiment when all passageways are subject to ambient pressure.

As shown in FIG. 16, spring brake control means 574 includes quick release valve 705, double check valve 712 and pressure sensitive valve 786. Conduit 790 connects to relay valve 576 (FIG. 15) and reservoir port 502 (FIG. 14). Conduit 721 connects to control port 539 (FIG. 14). As those skilled in the art will readily recognize, these alternate embodiments operate in similar fashion to the embodiments of FIGS. 1-12. They provide, however, an alternate packaging which may be more suitable to a particular installation.

By providing an integral housing 572 which contains the skid control unit, the relay valve 576, and the spring brake module 574, a complete single package is provided which allows for easy installation. The integral single housing 572 permits the simple, compact, and inexpensive mounting of the full function skid control assembly onto a vehicle with minimal risk of error.

The ABS Algorithm

The skid control units 52 and 552 have two main ABS states, pressure release (dump) and pressure hold (hold). An additional state may be made by introducing short breaks in the hold state causing a slower-than-otherwise increase in the brake delivery pressure (rise). In order to enter ABS mode or move from one state to another preset logic thresholds must be met.

The skid control unit 52 uses a pressure reduction phase, dump, a hold phase, and two re-apply phases, fast and slow rise. Fast rise (inshot) is a rapid re-application of pressure to a high proportion of skid pressure and slow rise is a gradual rise towards skid pressure. The slow rise phase may last up to about 1 sec. before a fast but still controlled phase is entered for up to about 0.5 sec. before it determined that the current skidding condition has ended.

The Dump State

The dump state checks the wheel speed against a threshold derived from the vehicle reference. If the wheel speed is below this the wheel may have exceeded the point of maximum adhesion. Accordingly, before the brake pressure is released, the wheel deceleration is compared against a preset threshold. If both the speed and deceleration thresholds are satisfied, then in the case of the FIG. 3A embodiments, the dump solenoid 260 and hold solenoid 256 are energized to reduce brake pressure. The thresholds for speed and deceleration are optimized to allow a high level of braking but also to detect the development of a skid condition quickly.

If both the speed and deceleration thresholds are satisfied in the case of the FIG. 3B embodiment, then the dump solenoid 260 is energized to reduce brake pressure. As in the FIG. 3A embodiment, the thresholds for speed and deceleration are optimized to allow a high level of braking but also to detect the development of a skid condition quickly.

ABS Hold

The dump state normally terminates to an ABS hold condition. In the case of the FIG. 3A embodiment, the hold solenoid 256 remains energized while the dump solenoid 260 is rapidly de-energized. This is done when the skid condition ceases and the wheel begins to recover. If a wheel is locked then the dump state is not terminated until any wheel speed is seen. If during hold the wheel again skids as may happen with a change in friction levels then the dump state may again be entered; otherwise, the hold condition is exited to rise.

For the ABS hold condition in the case of the FIG. 3B embodiment, the hold solenoid 256 is energized after the dump solenoid is de-energized. This is done when the skid condition ceases and the wheel begins to recover. If a wheel is locked then the dump state is not terminated until any wheel speed is seen. If during hold the wheel again skids as may happen with a change in friction levels, then the dump state may again be entered; otherwise, the hold condition is exited to rise.

ABS Rise

The ABS rise state is entered based on the speed of the wheel compared to the vehicle reference speed allowing for its acceleration, rapid accelerations entering rise early and slow accelerations being delayed. Once the rise condition is detected, then inhibit timers to delay dump detection are set and the pressure control phase is entered and the ABS set to dump detect.

Pressure Control

The pressure control in the skid control units 52 and 552 is carried out by the electronic controller (not shown). In order to do this the wheel acceleration from a skid condition is monitored as the best indicator of the road surface friction level and the vehicle load condition. A high friction laden wheel will accelerate much quicker than a low friction unladen wheel, about 30 g or more against less than about 1 g. The required solenoid firing to produce the desired pressure response can be determined from the wheel acceleration. However the demand pressure directly affects the modulator response and so the controller adapts its solenoid firing to produce the desired pressure response by learning what the demand pressure is.

The controller makes the initial assumption that the vehicle is in a laden state. This means the first re-apply "knee point" may be too high. The controller determines this by monitoring the interval between skids and attempting to optimize this time (or number of slow rise steps). Thus, if after a skid cycle, the next occurs sooner than the controller determines it should have, the fast rise firing is reduced. If it occurs later than is determined, then the solenoid firing is increased accordingly.

For both the FIG. 3A and the 3B embodiments, the controller can adjust the solenoid firing in about 0.5 millisecond (ms) steps up to a maximum of about 128 ms. The actual range, however, is usually less, e.g., about 5 to 90 ms.

By monitoring the wheel acceleration the pressure in the brake can be kept at an optimum under varying condition of surface friction, vehicle loading, and demand pressure.

The ABS logic uses a select low principle with dump having priority over hold and hold having priority over rise. The rise and pressure control are determined from the wheel with the deepest skid, this being the best indicator of the wheel with the lowest friction level, or on a homogenous surface the wheel with the greatest tendency to skid.

Other Configurations of the Braking System

Figure 17:
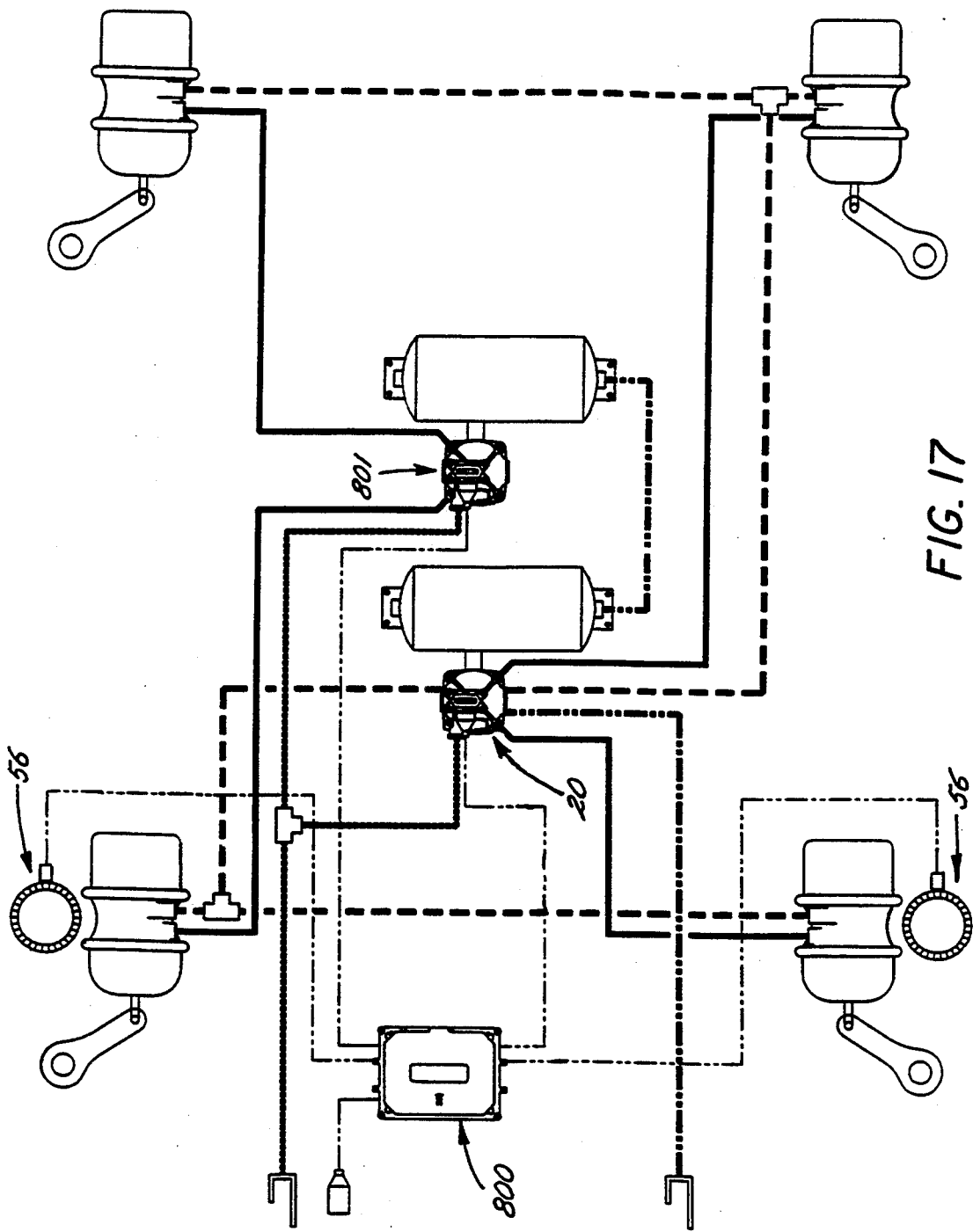
FIGS. 17, 18, 19 and 20 are overall views of alternative air systems utilizing multiple full function skid control valve assemblies.
Figure 18:
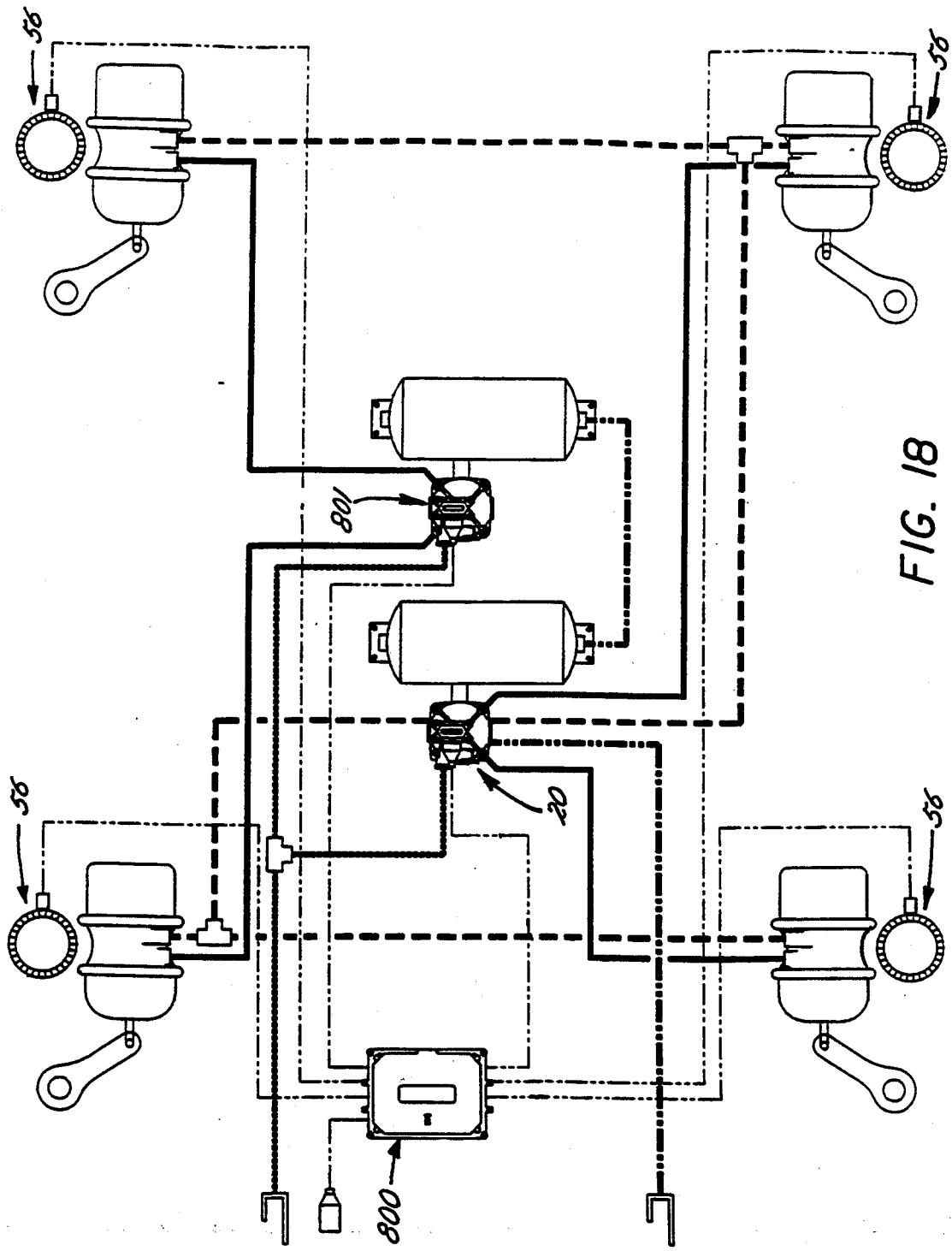
Figure 19:
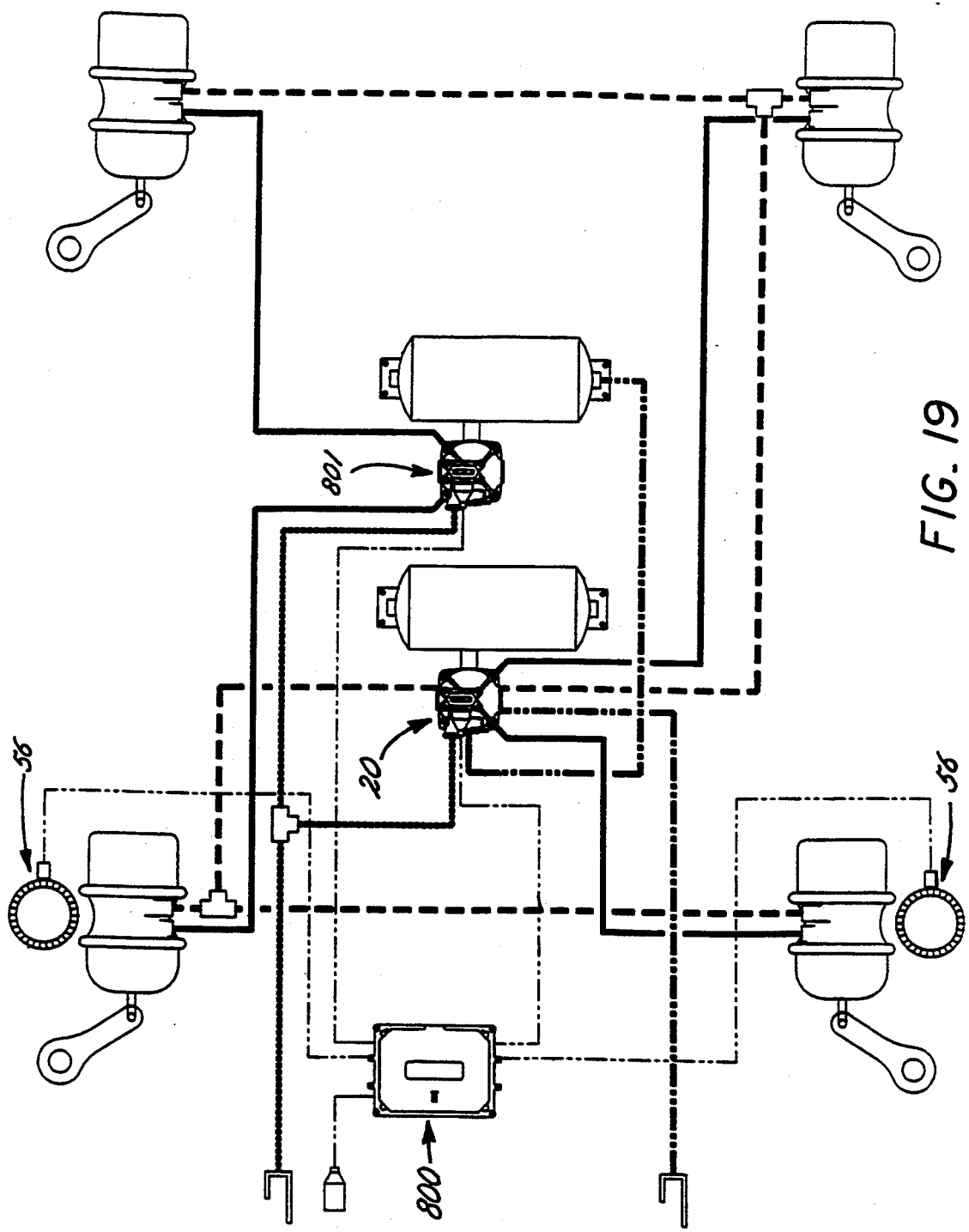

Although the overall vehicle braking system 22 (FIG. 1) has been shown with one full function skid control valve assembly 20 and one skid control unit 52 connected to two skid control sensor assemblies 56, alternative configurations may be utilized. For example, as shown in FIGS. 17–20, multiple assemblies 20 may be installed on one vehicle to control the brakes of each axle individually. In addition, the multiple systems can be configured in a side-by-side arrangement. In such higher order systems, it can be advantageous to consolidate the skid control units 52 into a single group 800 which controls the full function skid control valve assemblies 20, either individually or collectively or based on some variation. The various configurations of the consolidated skid control units can be designed based on the number of separate full function skid control valve assemblies 20 and the desirability of independent control for each assembly 20. Depending on the number of skid control units 52 that are incorporated into the consolidated system, multiple skid control sensor assemblies 56 may be utilized to further individualize the control of each full function skid control valve assembly 20. As shown in FIGS. 17 and 19, two sensor assemblies 56 are utilized, while in FIGS. 18 and 20, four assemblies are used. Those skilled in the art will understand that only one spring brake control means 74 (FIG. 2) is required when multiple skid control sensor assemblies 56 are utilized and, therefore, the additional assemblies 56 can be constructed without requiring the mechanism for controlling the spring brakes. In the brake systems utilizing multiple standard skid control valve assemblies 801, the additional standard skid control valve assemblies may also be utilized in conjunction with the full function skid control valve assembly 20 as shown in FIGS. 17 and 18.

Figure 20:
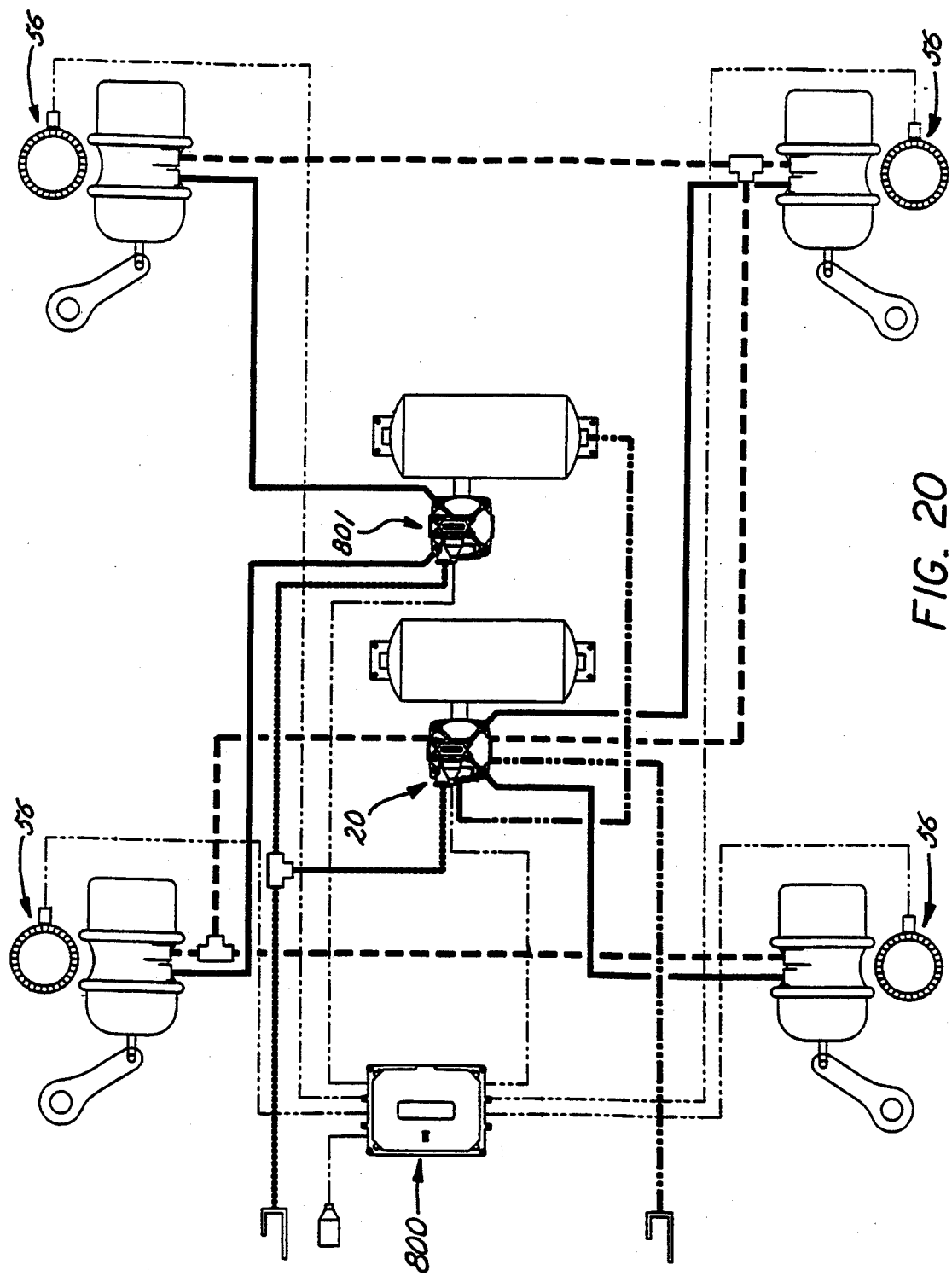

FIGS. 19 and 20 show a configuration designed to provide a split protected service system by the addition of a check valve and a reservoir port. Air passes pressure protection piston 124 (FIG. 3A and 3B) and flows into passage 126. The air can then flow into the separate reservoirs. The addition of a check valve between the reservoirs provides split protection for each reservoir by allowing air only to flow towards the additional reservoir and assemblies.

Objects of Invention Achieved

As is apparent from the above descriptions of several embodiments, the objects of the invention have been achieved. The brake system of the invention also provides improved operator safety through the use of the spring brake system including a pressure protection valve which assures a minimum pressure in the system and allows for filling the reservoirs simultaneously with the spring brake chambers. Further, the double check valve of the invention eliminates compounding which may prematurely cause the brake system to fail.

In addition, the full function skid control valve assembly of the invention allows the use of existing brake components to reduce system cost and ease service and maintainability of the system. The use of the integral housing reduces the requirements of fittings and air lines, thereby reducing cost and air leaks. Consequently, the assembly of the invention involves fewer discrete component valves.

Still other aspects, objects and advantages of the present invention can be obtained from the study of the specifications, the drawings, and the appended claims. It is to be understood that any issued claims based in whole or part on this application or on any division, continuation or continuation-in-part thereof, are to be accorded a range of equivalents commensurate in scope with the advance made over the prior art.

What is claimed is:

1. A braking control assembly for actuating the brakes of a vehicle including a source of pressurized air, means operable by the vehicle operator for providing brake actuation pressure when the operator actuates the means and relieving air pressure when the operator deactuates the means, skid sensing means for providing skid condition signals, and brake cylinders having service brake chambers and spring brake chambers in association with each of the brakes, said braking control assembly enclosed within a single housing and comprising:

a pressure sensitive valve fluidly coupled to the source of pressurized air which permits air to flow into said assembly when the air pressure from the source is sufficiently large and preventing air from flowing when the air pressure is not sufficiently large, a release valve fluidly coupled to said pressure sensitive valve for receiving air pressure from said assembly, said release valve permitting air to flow into the spring brake chambers of the brake cylinders from said assembly when the air pressure in the spring brake chambers is less than the air pressure in said assembly and permitting air to flow out of the spring brake chambers of the brake cylinders when the air pressure in said assembly is less than the pressure in the spring brake chambers;

a relay valve fluidly coupled to the service brake chambers of the brake cylinders which permits air to flow into the service brake chambers from said assembly and out of the service brake chambers, said relay valve being responsive to air pressure present in a control chamber of said relay valve governing whether said valve permits air to flow into or out of the service brake chambers, the control chamber being fluidly coupled to the means operable by the vehicle operator for receiving the brake actuation pressure; and, control valves fluidly interposed between said relay valve and the means operable by the vehicle operator which operate partially to control the air pressure within the control chamber of said relay valve, said control valves acting to prevent an increase in pressure or to exhaust the pressure within the control chamber of said rely valve in response to skid condition signals from the skid sensing means.

2. A braking assembly as recited in claim 1 further comprising:

a reservoir fluidly coupled to said assembly and said pressure sensitive valve for receiving and storing pressurized air from said assembly, said reservoir additionally being fluidly coupled to said relay valve for providing a secondary air supply which may be utilized to deliver air pressure to the service brake chambers of the brake cylinders.

3. A braking assembly as recited in claim 1 wherein said pressure sensitive valve permits air to flow into said assembly when the air pressure from the source is equal to or greater than 70 psi.

4. A braking assembly as recited in claim 1 wherein said release valve prevents air from flowing into the spring brake chambers of the brake cylinders from said assembly while air flows out of the spring brake chambers.

5. A braking assembly as recited in claim 1 wherein said release valve prevents air flowing out of the spring brake chambers of the brake cylinders from flowing into said assembly.

6. A braking assembly as recited in claim 1 wherein said control valves are actuated in response to the energization of electric solenoids.

7. A braking assembly as recited in claim 1 wherein said control valves include a holding valve which when actuated prevents the brake actuation pressure generated by the means operable by the vehicle operator from increasing the air pressure within the control chamber of said relay valve and a dump valve which when actuated allows air pressure from the service brake chambers of the brake cylinders to escape.

8. A braking assembly as recited in claim 7 wherein the dump valve of said control valves, when actuated, prevents the brake actuation pressure generated by the means operable by the vehicle operator from increasing the air pressure within said control chamber of said relay valve.

9. A braking assembly as recited in claim 7 wherein air pressure is permitted to escape from the control chamber of said relay valve when the brake actuation pressure generated by the means operable by the vehicle operator is less than the pressure within said control chamber regardless of whether said control valves are actuated.

10. A braking system for use with a vehicle comprising:

a source of pressurized air;

brake cylinders for actuating the brakes of the vehicle including service brake chambers which actuate the brakes when the pressure in said service brake chambers is sufficiently high and spring brake chambers which actuate the brakes when the pressure in said spring brake chambers is sufficiently low; and a valve assembly coupled to said source of pressurized air for controlling the flow of pressurized air to said service brake chambers and said spring brake chambers wherein said valve assembly includes a release valve connected to said spring brake chambers for permitting pressurized air from said valve assembly to flow into said spring brake chambers when the air pressure in the braking system is above predetermined levels and for permitting pressurized air from said spring brake chambers to escape when the air pressure in the braking system is below predetermined levels, a relay valve within said valve assembly coupled to said service brake chambers for permitting air from said valve assembly to flow into said service brake chambers and for permitting air from said service brake chambers to escape in response to control signals, and a control unit within said valve assembly receiving brake actuation signals generated by the vehicle operator and skid condition signals for providing the control signals to said relay valve to control the actuation of said service brakes and prevent skids from occurring.

11. A braking assembly as recited in claim 1 wherein said release valve permits air to flow out of the spring brake chambers of the brake cylinders when the air pressure in said assembly is a predetermined level less than the pressure in the spring brake chambers.

* * * * *

UNITED STATES PATENT AND TRADEMARK OFFICE
CERTIFICATE OF CORRECTION

PATENT NO.  : 5,409,303
DATED       : April 25, 1995
INVENTOR(S) : Engelbert, et al.

It is certified that error appears in the above-indentified patent and that said Letters Patent is hereby corrected as shown below:

Title page, after "Filed: Jun. 2, 1994" should have the following inserted text:
-- Related U.S. Application Data

Continuation-in-part of Ser. No. 78,139, Jun. 15, 1993, Pat. No. 5,425,572. --

Col. 1, line 4 should read
-- This application is a continuation-in-part of copending U.S. application Serial No. 08/078,139, filed June 15, 1993, now U.S. Patent No. 5,425,572, entitled "Quick-Release Valve for a Vehicle Air Release Brake System", in the names of Robert L. Koelzer and Steven D. Wallestad. --

UNITED STATES PATENT AND TRADEMARK OFFICE
CERTIFICATE OF CORRECTION

PATENT NO. : 5,409,303
DATED : April 25, 1995
INVENTOR(S) : Engelbert, et al.

It is certified that error appears in the above-indentified patent and that said Letters Patent is hereby corrected as shown below:

After Col. 5, line 55, after part 109." insert -- Desired characteristics of quick release valves employed as valve 105 are detailed in the aforesaid parent copending application Serial No. 08/078,139, filed June 15, 1993, now U.S. Patent No. 5,425,572, the preferred embodiment of FIG. 6 thereof also being the presently-preferred embodiment for use in the present skid control braking system. --

Signed and Sealed this

Tenth Day of June, 1997

Attest:

BRUCE LEHMAN

Attesting Officer

Commissioner of Patents and Trademarks